United States Patent
Usui

(10) Patent No.: US 8,503,738 B2
(45) Date of Patent: Aug. 6, 2013

(54) IMAGE PROCESSING APPARATUS, IMAGE PROCESSING METHOD, AND COMPUTER PROGRAM FOR PROCESSING IMAGES

(75) Inventor: Masaya Usui, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 738 days.

(21) Appl. No.: 12/396,029

(22) Filed: Mar. 2, 2009

(65) Prior Publication Data
US 2009/0226095 A1 Sep. 10, 2009

(30) Foreign Application Priority Data
Mar. 5, 2008 (JP) .................. 2008-054271

(51) Int. Cl.
*G06K 9/00* (2006.01)
(52) U.S. Cl.
USPC .................. 382/118; 382/254; 382/276

(58) Field of Classification Search
USPC ........................... 382/118, 254, 276
See application file for complete search history.

(56) References Cited

U.S. PATENT DOCUMENTS
2003/0123713 A1* 7/2003 Geng .................. 382/118

FOREIGN PATENT DOCUMENTS
JP 2004-318204 11/2004

* cited by examiner

*Primary Examiner* — John Strege
(74) *Attorney, Agent, or Firm* — DLA Piper LLP (US)

(57) ABSTRACT

An image processing apparatus includes a face direction estimating section that estimates a direction and a degree of swing of a face in a target image including a face image when a front direction of the face is used as a reference, and an image correcting section that transforms a correction target area to be corrected, which includes at least a part of the face image, in accordance with the degree of swing.

6 Claims, 24 Drawing Sheets

$T1 \leq DI (= Hr1/Wr1) < T2$

⇩

FRONT DIRECTION $DI (= Hr2/Wr2) \geq T2$
BESIDES
$Wer2 > Wel2$

⇩

RIGHT SWING

FIG. 12 tb0

(TABLE FOR 0° (FRONT SIDE))

|     | H  | V  |
| --- | -- | -- |
| D11 | 7  | 14 |
| D21 | 7  | 14 |
| D31 | -7 | 14 |
| D41 | -7 | 14 |
| D12 | 7  | 0  |
| D22 | 0  | 0  |
| D32 | 0  | 0  |
| D42 | -7 | 0  |

FIG. 15
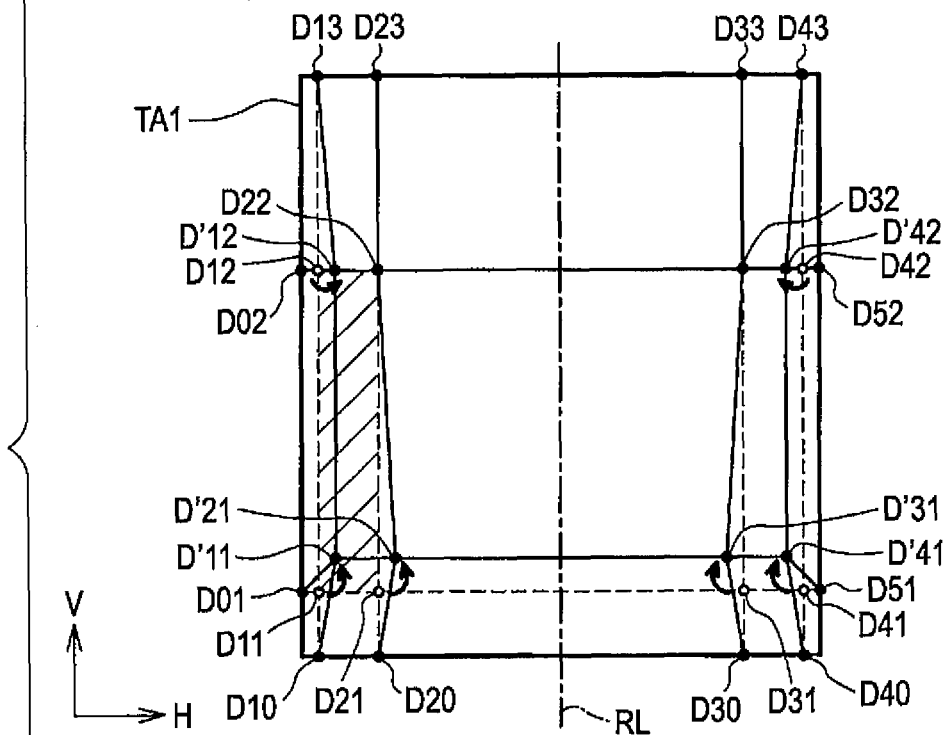
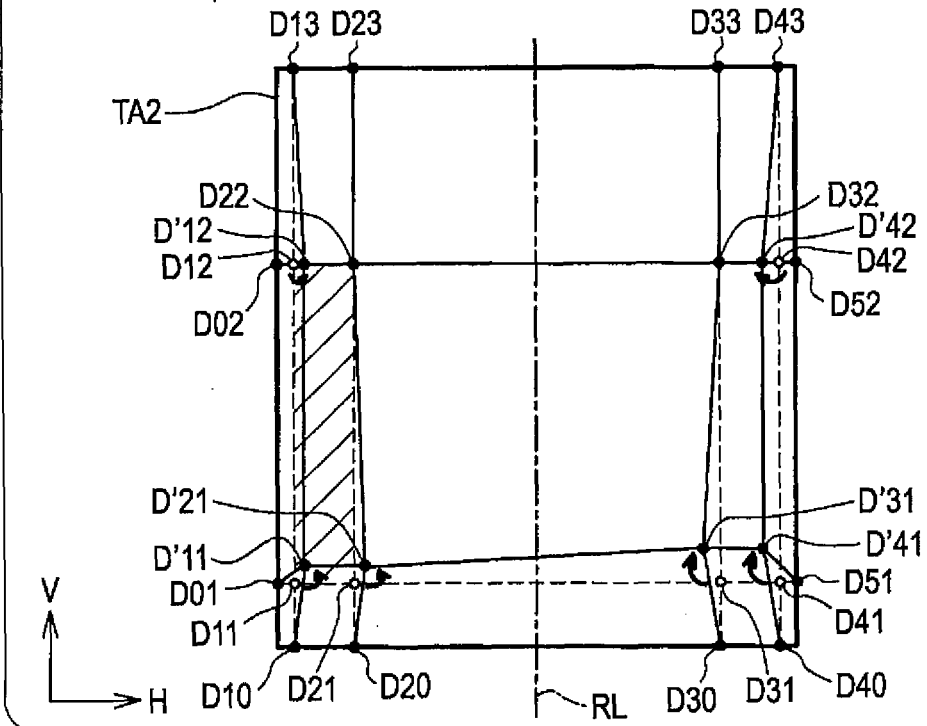

<COMPARATIVE EXAMPLE>

(APPLICATION OF TABLE tb0 FOR 0°)

FIFTH EMBODIMENT

<DIVISION-POINT MOVEMENT TABLE>

FIFTH EMBODIMENT

FIG. 26
FIFTH EMBODIMENT
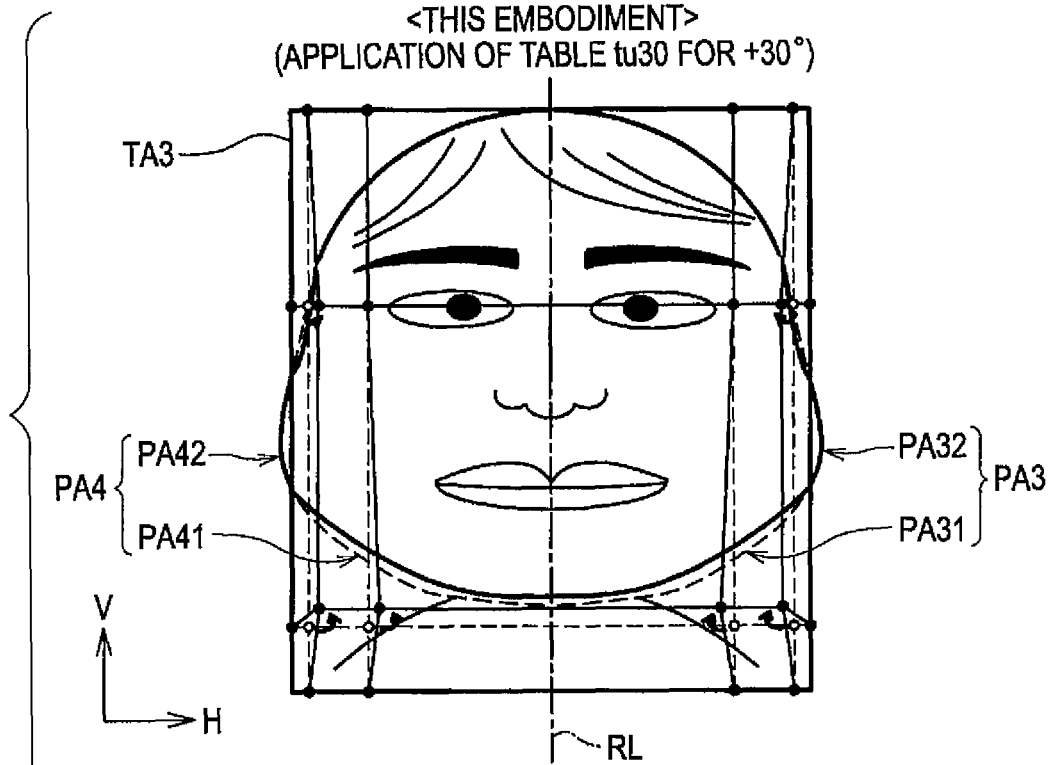
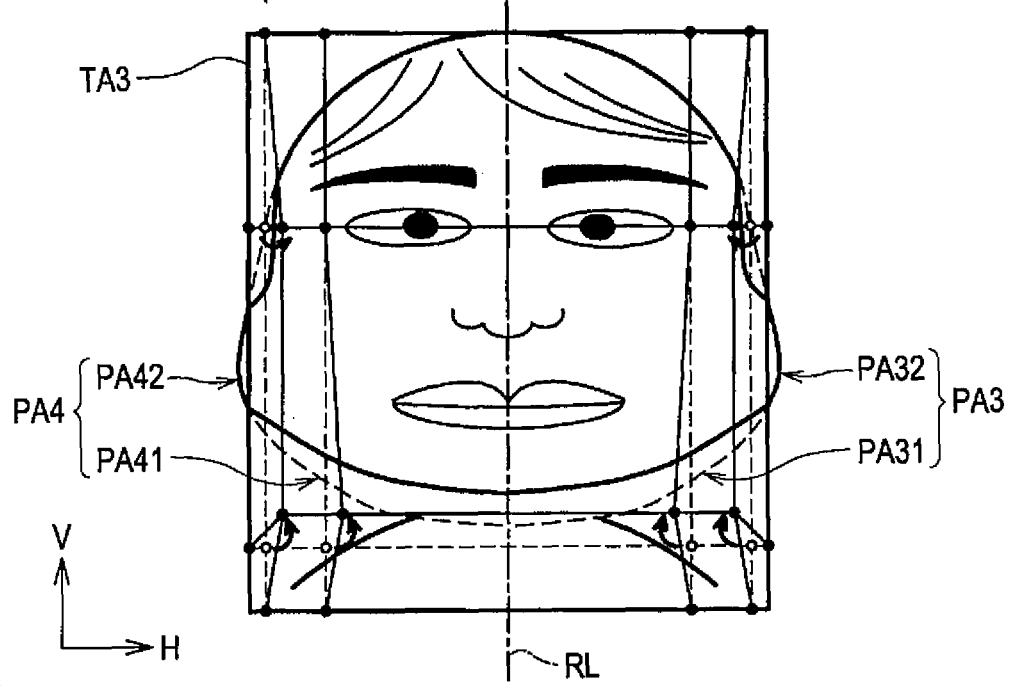

FIFTH EMBODIMENT

<DIVISION POINTS D11, D12, D21, D31, D41, D42> ical Field
The present invention relates to an image processing technique for transforming a face image in an image including the face image.

2. Related Art

Image processing techniques are known for transforming a digital image in order to improve the appearance of a face image of a person in the digital image. For example, JP-A-2004-318204 proposes a technique in which a partial area (an area expressing an image of cheeks) on a face image including a face of a person or the like is set as a correction area, the correction area is divided into plural small areas in accordance with a predetermined pattern, and the image is magnified or minified every small area at a set scaling factor, in order to transform the shape of the face image.

Since such image processing techniques were developed for images having a face captured in a front direction, face images after a transformation process may become unnatural when the face is captured in a direction other than the front direction, that is, when the face is swung in a left, right, upper, or lower direction.

SUMMARY

The present invention provides a technique for transforming a face image to look good even when the face included in the face image faces a direction other than a front direction.

An image processing apparatus according to an embodiment of the invention includes a face direction estimating section that estimates a direction of a face and a degree of swing of the face in a target image including a face image when a front direction of the face is used as a reference, and an image correcting section that transforms a correction target area to be corrected, which includes at least a part of the face image, in accordance with the degree of swing.

Since the image processing apparatus transforms the correction target area including at least a part of the face image in accordance with the face direction and the degree of swing of the face, the image processing apparatus can transform the correction target area to an appropriate extent and within a proper range and thus can transform the face image to look good even when the face faces a direction other than the front direction.

In one application example of the image processing apparatus, the image correcting section reduces a degree of transformation for the correction target area when the degree of swing is larger than a certain value compared to when the degree of swing is smaller than the certain value.

In this way, since the transformation degree is decreased when the degree of swing of the face is relatively large and thus there is a high possibility that the face image after transformation will be unnatural, the face image can be restrained from being unnatural after the transformation. Moreover, since the transformation degree is increased when the degree of swing of the face is relatively small and there is a low possibility that the face image after transformation will be unnatural, an expected good face image can be obtained by means of the transformation.

In another application example of the image processing apparatus, the image correcting section reduces a degree of transformation for an area on the opposite side of the face direction in the correction target area compared to a degree of transformation for an area on the same side as the face direction.

In this way, since the area on the opposite side of the face direction may be not suitable for transformation, a transformation degree for the area is relatively decreased and the face image after transformation is restrained from being unnatural. Moreover, since the area on the same side as the face direction has a high possibility of being suitable for the transformation, a transformation degree for the area is relatively increased and an expected good face image can be obtained by means of the transformation.

In another application example of the image processing apparatus, the image correcting section does not transform at least an area on the opposite side of the face direction in the correction target area when the degree of swing is larger than a predetermined threshold value.

In this way, since an area including at least a part of the area (the area concerned to be unnatural by transformation) positioned in the opposite direction of the face direction is not transformed when the degree of swing of the face is larger than a predetermined threshold, the face image can be restrained from being unnatural after the transformation.

In another application example of the image processing apparatus, when estimating the direction of the face and the degree of swing of the face, the face direction estimating section (i) detects an area including an organ image of the face in the target image as an organ area, (ii) computes a reference width as an index correlated with a width of the face and a reference height as an index correlated with a height of the face on the basis of the organ area, and (iii) estimates the direction of the face and the degree of swing of the face on the basis of a ratio between the reference width and the reference height.

In this way, since the ratio between the reference width and the reference height is changed in accordance with a direction and degree of swing of the face, the direction and degree of swing can be estimated on the basis of the ratio between the reference width and height.

An image processing method according to an embodiment of the invention includes (a) estimating a direction of a face and a degree of swing of the face in a target image including a face image when a front direction of the face is used as a reference, and (b) transforming a correction target area to be corrected, which includes at least a part of the face image, in accordance with the degree of swing.

In the image processing method, since a correction target area including at least a part of the face image is transformed in accordance with a face direction and a degree of swing of the face, the face image can be transformed to look good in an appropriate degree or range even when the face faces a direction other than the front side.

Another embodiment of the invention is a computer program for processing images. The program is embodied on a computer readable medium and causes a computer to execute functions of estimating a direction of a face and a degree of swing of the face in a target image including a face image when a front direction of the face is used as a reference, and transforming a correction target area to be corrected, which includes at least a part of the face image, in accordance with the degree of swing.

In the computer program, since a correction target area including at least a part of the face image is transformed in accordance with a face direction and a degree of swing of the face, the face image can be transformed to look good in an appropriate degree or range even when the face faces a direction other than the front side.

The invention can be realized by various kinds of configurations. For example, the invention can be realized by various recording mediums for recording the above-described computer program.

BRIEF DESCRIPTION OF THE DRAWINGS

The invention will be described with reference to the accompanying drawings, in which like numbers refer to like elements.

FIG. 12 is a division-point movement table (table for 0°) for a face direction that is a front direction (degree of face swing=0°).

FIG. 15 is an explanatory diagram showing examples of movement of each division point when the tables for 0° and for +30° of FIG. 14 are respectively applied.

FIG. 26 is an explanatory diagram showing a concrete transformation aspect for a transforming area when the table for +30° is used and when the table for 0° is used.

DESCRIPTION OF EXEMPLARY EMBODIMENTS

Hereinafter, embodiments of the invention will be described in the following order.
A. First Embodiment
B. Second Embodiment
C. Third Embodiment
D. Fourth Embodiment
E. Fifth Embodiment
F. Modified Examples

A. First Embodiment

A1. Configuration of Apparatus

Figure 1:
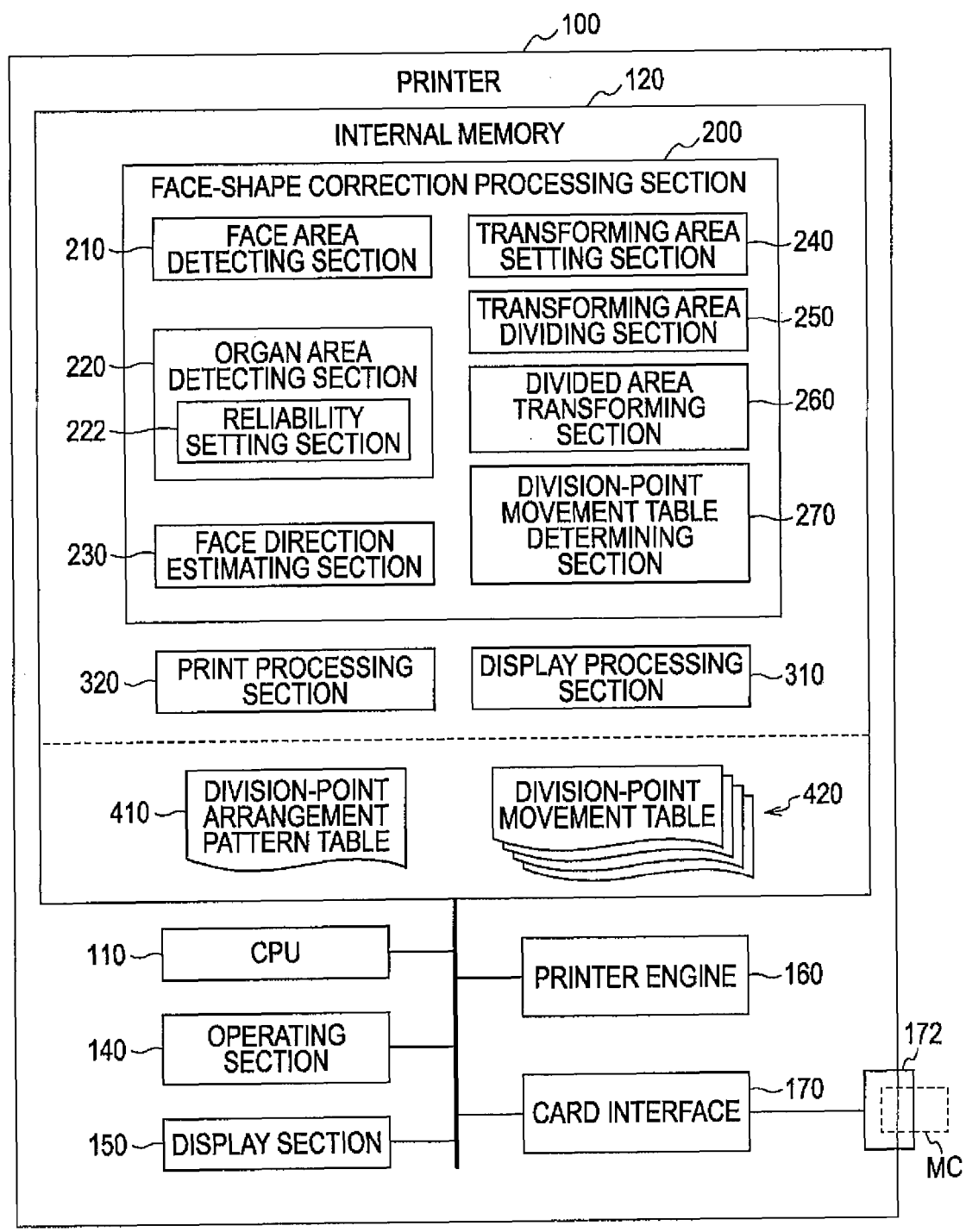
FIG. 1 is a block diagram of a printer as an image processing apparatus according to a first embodiment of the invention.

FIG. 1 is a block diagram of a printer 100 as an image processing apparatus according to a first embodiment of the invention. Printer 100 is a color ink jet printer for direct printing, in which an image is printed out on the basis of image data obtained from a memory card MC or the like. The printer 100 includes an internal memory 120, a CPU 110, an operating section 140, a display section 150, a printer engine 160, a card interface (card I/F) 170, and a card slot 172.

The internal memory 120 consists of a ROM and/or a RAM, and includes a face-shape correction processing section 200, a display processing section 310, a print processing section 320, a division-point arrangement pattern table 410, and a division-point movement table 420. The face-shape correction processing section 200 is a computer program embodied on a computer-readable medium for executing a face-shape correction process under a predetermined operating system. As a program module, this face-shape correction processing section 200 includes a face area detecting section 210, an organ area detecting section 220, a face direction estimating section 230, a transforming area setting section 240, a transforming area dividing section 250, a divided area transforming section 260, and a division-point movement table determining section 270. The display processing section 310 is a display driver that controls the display section 150 to display a process menu, a message, and an image on the display section 150. The print processing section 320 is a computer program embodied on a computer-readable medium for generating print data from the image data and controlling the printer engine 160 to print an image. The CPU 110 reads and executes the above-described programs from the internal memory 120 in order to realize the functions of the sections.

The operating section 140 includes a button or a touch panel to accept an input such as an instruction from a user. The display section 150 consists of a liquid crystal display. The printer engine 160 is a print machine for printing an image on the basis of the print data received from the print processing section 320. The card I/F 170 is an interface for receiving or sending data from or to the memory card MC inserted into the card slot 172. The printer may also include an interface for performing data communication with an apparatus (for example, a digital still camera or a personal computer) other than the card I/F 170. The above-described components are interconnected via buses.

The printer 100 having this configuration can execute a face shape correction process for an image including a face image, in order to transform an area including a part of the face image into a small area (hereinafter, referred to as "reduce a face area" or "make a face area slim"). Even when the direction of the face included in the face image is not the front side, the printer 100 is constituted so as to transform the image to look good.

The face direction estimating section 230 and the organ area detecting section 220 correspond to a face direction estimating section in claims. Moreover, the transforming area setting section 240, the transforming area dividing section 250, the divided area deforming section 260, and the division-point movement table determining section 270 correspond to an image correcting section in claims.

A2. Face Shape Correction Process

Figure 2:
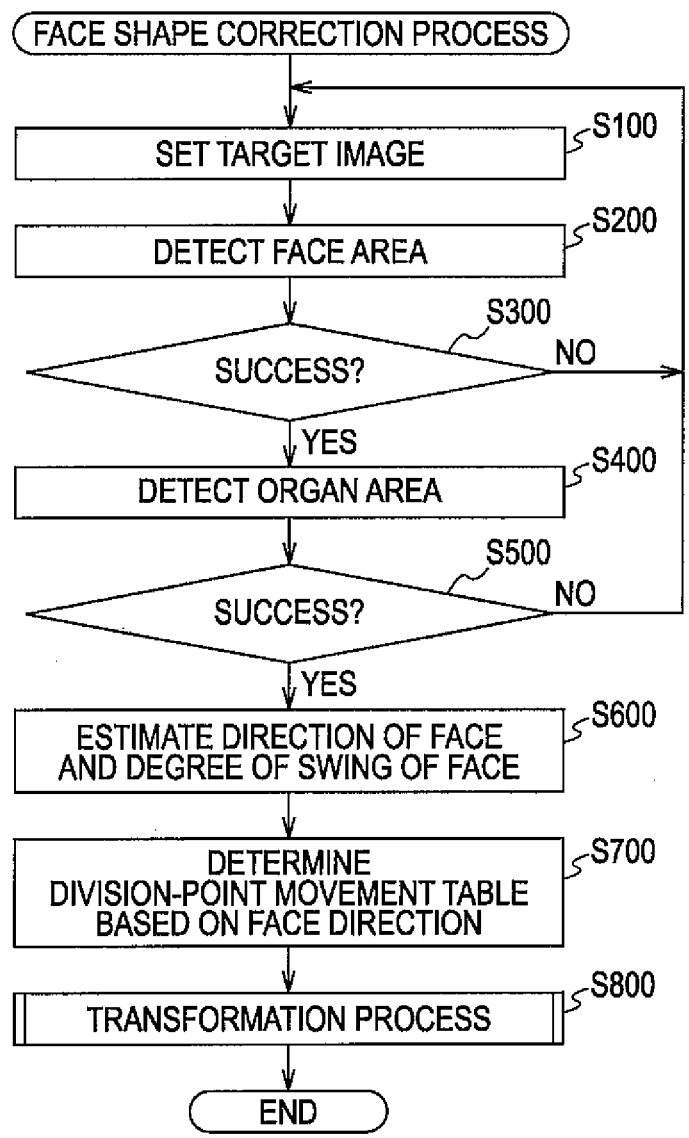
FIG. 2 is a flowchart of a face shape correction process.

FIG. 2 is a flowchart of a face shape correction process when the memory card MC is inserted into the card slot 172 and a predetermined operation is performed via the operating section 140 by a user, the face shape correction process is started.

In step S100, the face-shape correction processing section 200 sets a target image to be processed. Specifically, the face-shape correction processing section 200 instructs the display processing section 310 to display a predetermined user interface for setting a target image on the display section 150. The face-shape correction processing section 200 then sets the target image in accordance with the input from the user interface.

Figure 3:
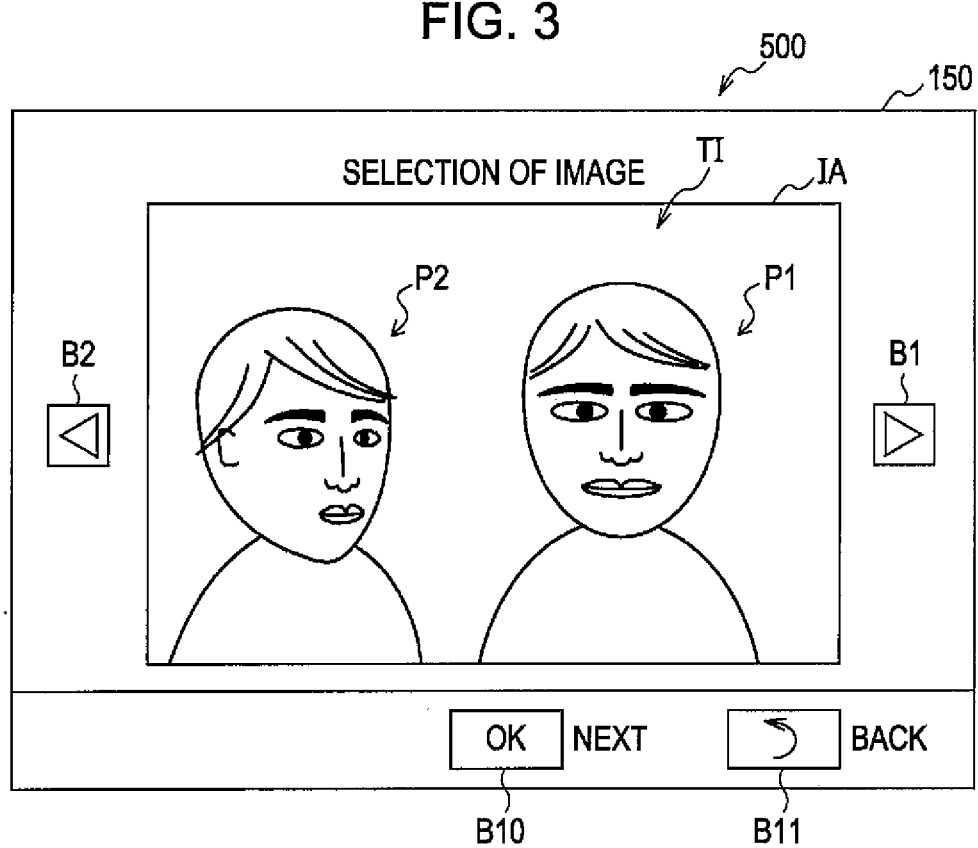
FIG. 3 is an explanatory diagram showing an example of a user interface for setting a target image displayed on a display section.

FIG. 3 is an explanatory diagram showing an example of a user interface for setting a target image displayed on the display section 150. This user interface (UI) for setting a target image (hereinafter, referred to as "target image setting UI") 500 consists of images for the user interface displayed on the display section 150. Specifically, the target image setting UI 500 includes an image display field IA, two buttons B1 and B2 for switching images, a determination button B10, and a cancellation button B11. A user can operate the two buttons B1 and B2 for switching images to select a target image and press down the determination button B10 to set the target image, while looking at the target image setting UI 500. In FIG. 3, the user selects an image TI as a target image in which two persons P1 and P2 are present and presses down the determination button B10 in this state. At this time, the face-shape correction processing section 200 sets the image TI as the target image. The target image setting UI 500 can also display a list for plural images within the memory card MC.

In step S200, the face area detecting section 210 detects a face area in the target image. The "face area" is an image area in the target image, which includes an image showing at least a part of a face. The face area detecting section 210 detects a rectangular area as a face area including an image of a face obtained by analyzing the target image. The detection of this face area may be executed by a known detection method such as, for example, by pattern matching using a template (see JP-A-2006-279460).

Figure 4:
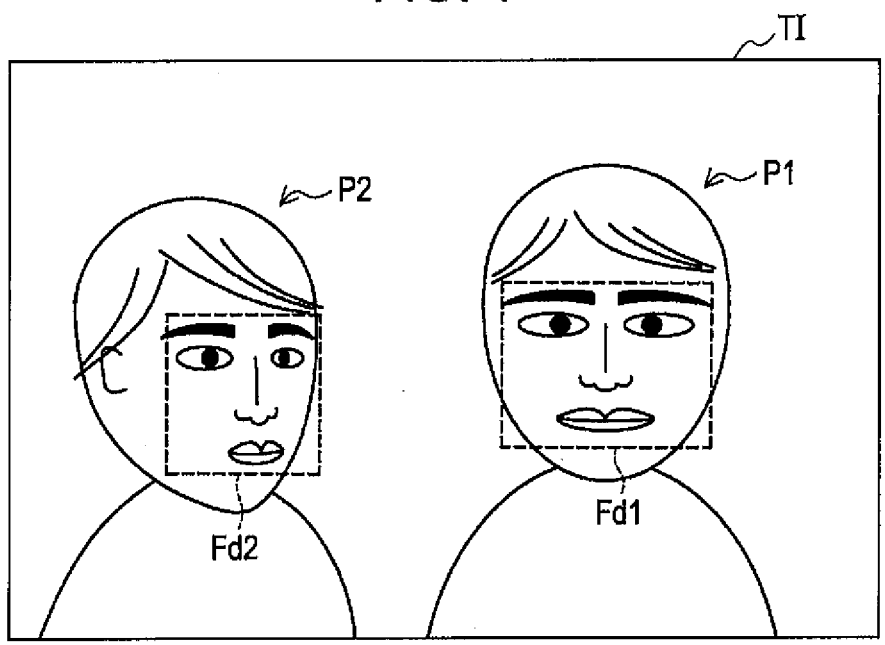
FIG. 4 is an explanatory diagram showing an example of a detection result for a face area.

FIG. 4 is an explanatory diagram showing an example of a detection result for the face area in step S200. In FIG. 4, since face images of the two persons P1 and P2 are included in the target image TI, an area Fd1 including the face image of the person P1 and an area Fd2 including the face image of the person P2 are detected. Here, the two face areas Fd1 and Fd2 are rectangular areas including the images of eyes, noses, and mouths. The face area detecting section 210 respectively specifies the two face areas Fd1 and Fd2 by means of coordinates with four vertexes for each face area.

When a face area is not detected in step S200 (No in step S300), that object is notified to the user via the display section 150. In this case, in order to make the user select another image as the target image, the target image setting UI 500 is displayed again on the display section 150 and the target image is reset (step S100). Alternatively, in place of returning to step S100, the face shape correction process may be terminated after the notice of the message.

On the other hand, when a face area is detected in step S200 (Yes in step S300), the organ area detecting section 220 detects an organ area in the target image (step S400). The "organ area" is an image area in the target image that includes at least a part of a facial organ. In this embodiment, the right and left eyes and mouth are set as facial organs, and "a right eye area including an image of the right eye", "a left eye area including an image of the left eye", and "a mouth area including an image of the mouth" are objects to be detected as organ areas. The organ area detecting section 220 analyzes a face area in the target image, and detects a rectangular area assumed to include the right eye as "the right eye area". Similarly, the organ area detecting section 220 detects a rectangular area assumed to include the left eye as "the left eye area" and a rectangular area assumed to include the mouth as "the mouth area". Similar to the detection of the face area, the organ area can be detected by a known detection method such as by pattern matching using a template.

Figure 5:
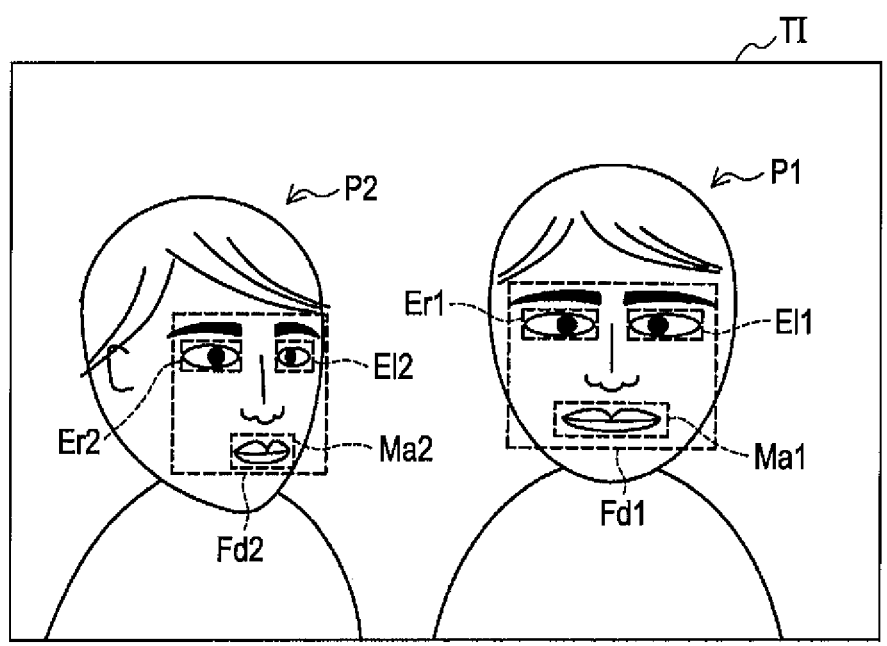
FIG. 5 is an explanatory diagram showing an example of a detection result for an organ area.

FIG. 5 is an explanatory diagram showing an example of a detection result for an organ area in step S400. In FIG. 5, a right eye area Er1, a left eye area El1, and a mouth area Ma1 in the face area Fd1 of the person P1 are detected. Similarly, in the face area Fd2 of the person P2, a right eye area Er2, a left eye area E12, and a mouth area Ma2 are detected. The organ area detecting section 220 can specify each of the detected organ areas Er1, El1, Ma1, Er2, E12, and Ma2 with coordinates of four vertexes for each area.

In addition, in this embodiment, the reliability setting section 222 (FIG. 1) sets a reliability index for each detected organ area. The reliability index expresses a probability with which the detected organ area is an area truly including an image of a facial organ. In this embodiment, the number of matches when plural pattern matching operations are performed while changing a template is used as a reliability index.

When an organ area is detected in step S400 (Yes in step S500), the process proceeds to step S600. In this embodiment, the case that an organ area is successively detected means that all three organ areas including the right eye, left eye and mouth areas are detected, and probabilities expressing reliability indexes for all the organ areas are higher than a predetermined threshold. When one or more of the three organ areas is not detected, or when the probability expressing the reliability index for any one of the three organ areas is lower than the predetermined threshold, detection for the organ areas fails.

In step S600, the face direction estimating section 230 estimates a direction and degree of swing of the face included in the target image and stores the estimated result in the internal memory 120. The "face direction" is a direction obtained by using the front side of the face (a direction facing the subject's face from an observer) as a reference. Moreover, the "degree of swing of a face" is an angle of a face direction when the front direction of the face is used as a reference (0°).

Figure 6:
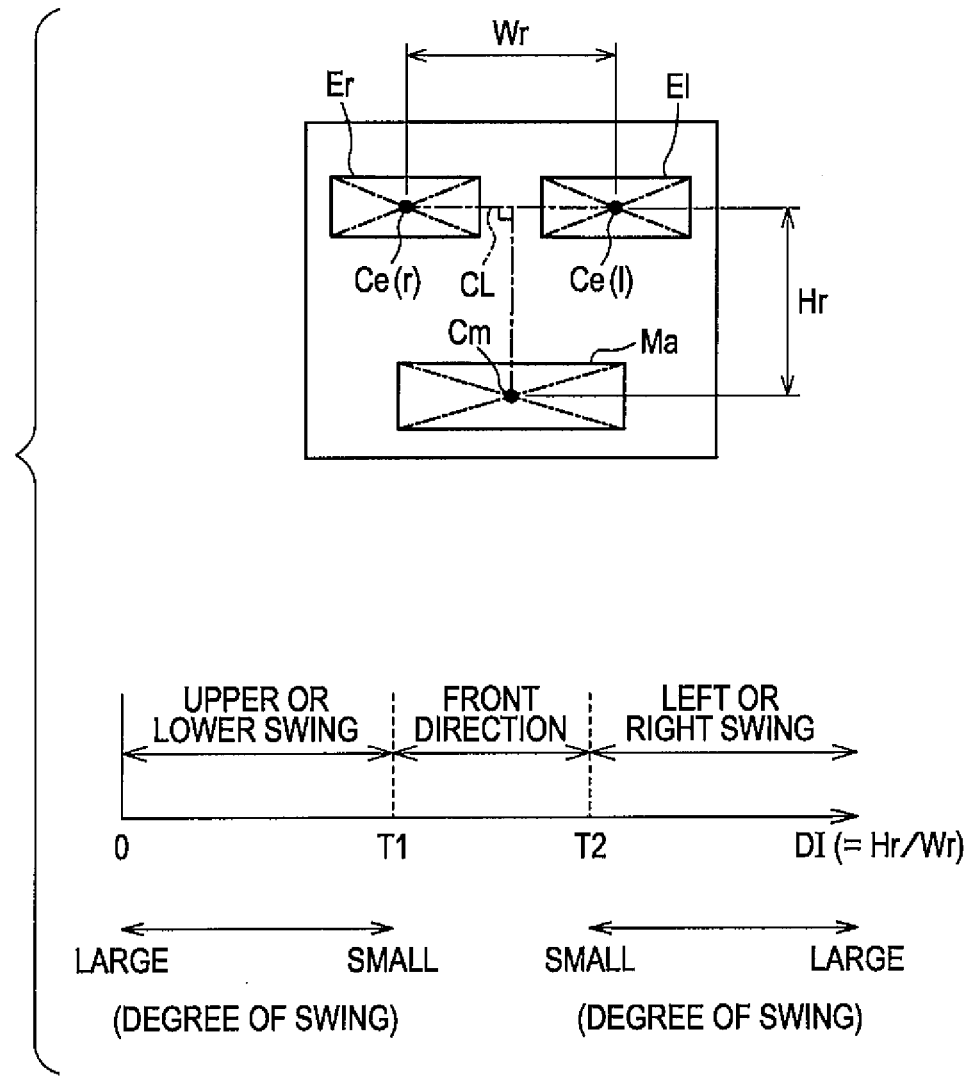
FIG. 6 is an explanatory diagram conceptually showing a method for estimating a direction and degree of swing of a face.

FIG. 6 is an explanatory diagram conceptually showing a method for estimating a direction and degree of swing of a face in step S600. In FIG. 6, a length of a line segment CL connecting the center point Ce(r) of the right eye area Er and the center point Ce(l) of the left eye area El is referred to as a reference width Wr, and a distance between the center point Cm of the mouth area Ma and the line segment CL is referred to as a reference height Hr. As apparent in FIG. 6, the reference width Wr is an index correlating with a width of the face, and the reference height Hr is an index correlating with a height of the face.

The face direction estimating section 230 computes the reference height Hr and the reference width Wr, computes a ratio (Hr/Wr) of the reference height Hr to the reference width Wr as a judgment index DI, and estimates a face direction on the basis of the judgment index DI. As illustrated in FIG. 6, when a value of the judgment index DI is not less than a threshold T1 and is less than a threshold T2, the face direction is estimated as the front direction. When the value of the judgment index DI is less than the threshold T1, the face is estimated to be swung in an upper or lower direction, and when the value of the judgment index DI is not less than the threshold value T2, the face is estimated to be swung in a right or left direction.

The "left swing" is a face direction when the subject's face is directed to the left side when viewed from an observer (in other words, the person actually faces the right side), and the "right swing" is a face direction when the subject's face is directed to the right side viewed when from the observer (in other words, the person actually faces the left side). Moreover, the "upper swing" is a face direction when the subject's face is directed to the upper side, and the "lower swing" is a face direction when the subject's face is directed to the lower side.

When the face is swung in the right or left direction, the reference height Hr is rarely changed but the reference width Wr is small compared to the case of the front direction. Therefore, when the face is swung in the right or left direction, the value of the judgment index DI (=Hr/Wr) becomes large compared to the case of the front direction. On the contrary, when the face is swung in the upper or lower direction, the reference width Wr is rarely changed but the reference height Hr is small compared to the case of the front direction. Therefore, when the face is swung in the upper or lower direction, the value of the judgment index DI (=Hr/Wr) becomes small compared to the case of the front direction. The threshold value T1 and the threshold value T2 are statistically determined from the judgment indexes DI (ratios between the reference widths Wr and the reference heights Hr) for a predetermined number of sample images of the face. The predetermined threshold values T1 and T2 are stored in a predetermined area in the internal memory 120, and the face direction estimating section 230 estimates a face direction by means of the judgment index DI for the target image, and the threshold values T1 and T2.

In addition, the judgment index DI may indicate a degree of swing of the face when the front direction is used as a reference. For example, in two face images estimated as a right swing or a left swing, one face whose judgment index DI is larger is estimated as having a larger degree of swing from the front direction as compared to the other face. Moreover, when the strict front direction is a direction in a state where the face and the image capturing apparatus (observer) are justly opposed to each other, the threshold values TI and T2 are determined by measuring how much the face is swung from the strict front direction and setting the amount of swing that can be estimated as the face direction irrespective of the swing of face.

Figure 7A:
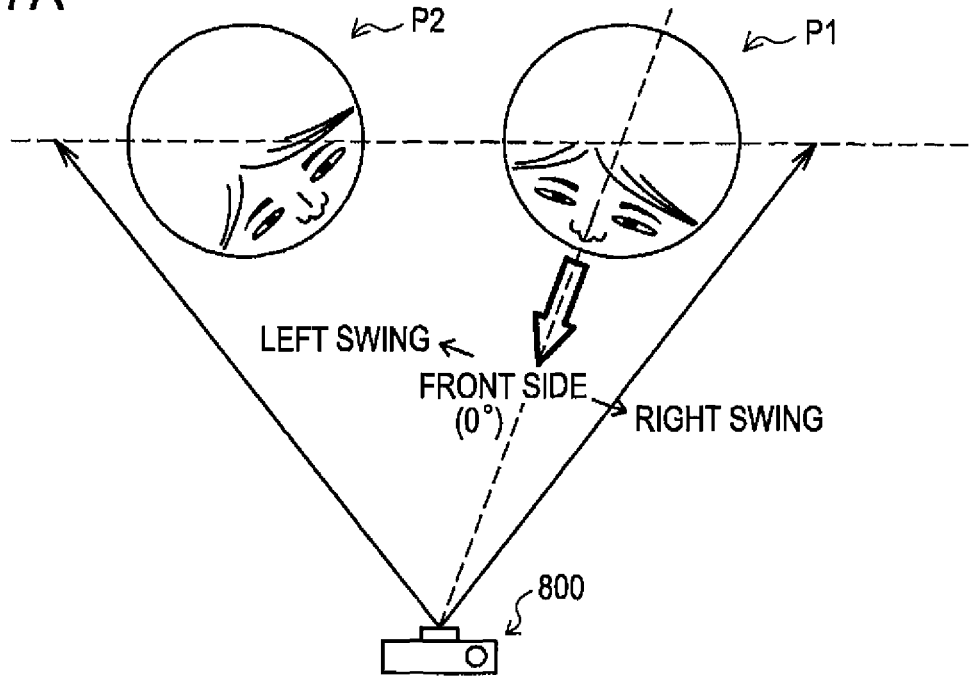
FIG. 7A is an explanatory diagram showing a positional relationship between a person and an image capturing apparatus when the target image of FIG. 5 is obtained.

FIG. 7A is an explanatory diagram showing a positional relationship between the person P1 and an image capturing apparatus when the target image TI of FIG. 5 is obtained. FIG. 7A shows a positional relationship between two persons P1 and P2 and the image capturing apparatus (digital still camera) 800 during photographing from the upper side. The two persons P1 and P2 are located at substantially same distances from the digital still camera 800 with respect to one another. The person P1 faces the digital still camera 800 in a front direction. Therefore, as illustrated in FIG. 5, the face direction of the person P1 becomes the front direction.

Figure 7B:
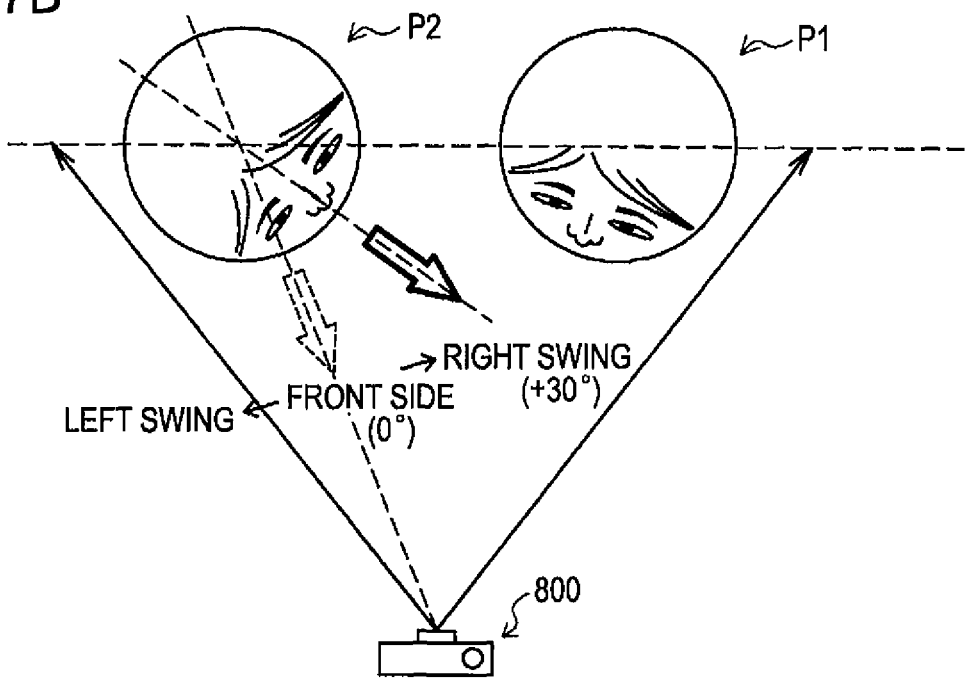
FIG. 7B is an explanatory diagram showing a positional relationship between another person and the image capturing apparatus when the target image is obtained.

FIG. 7B is an explanatory diagram showing a positional relationship between the person P2 and the image capturing apparatus when the target image TI of FIG. 5 is obtained. Similarl to FIG. 7A, FIG. 7B also shows a positional relationship between the two persons P1 and P2 and the digital still camera 800 during photographing from the upper side. The person P2 stands in a direction obtained by swinging the face by 30° (+30°) in the right direction when the direction facing the digital still camera 800 in a front direction is used as a reference. In the target image TI (FIG. 5) obtained by image capturing in such a positional relationship, the face direction estimating section 230 can estimate directions and degrees of swing of each face by the judgment index DI.

Figure 8A:
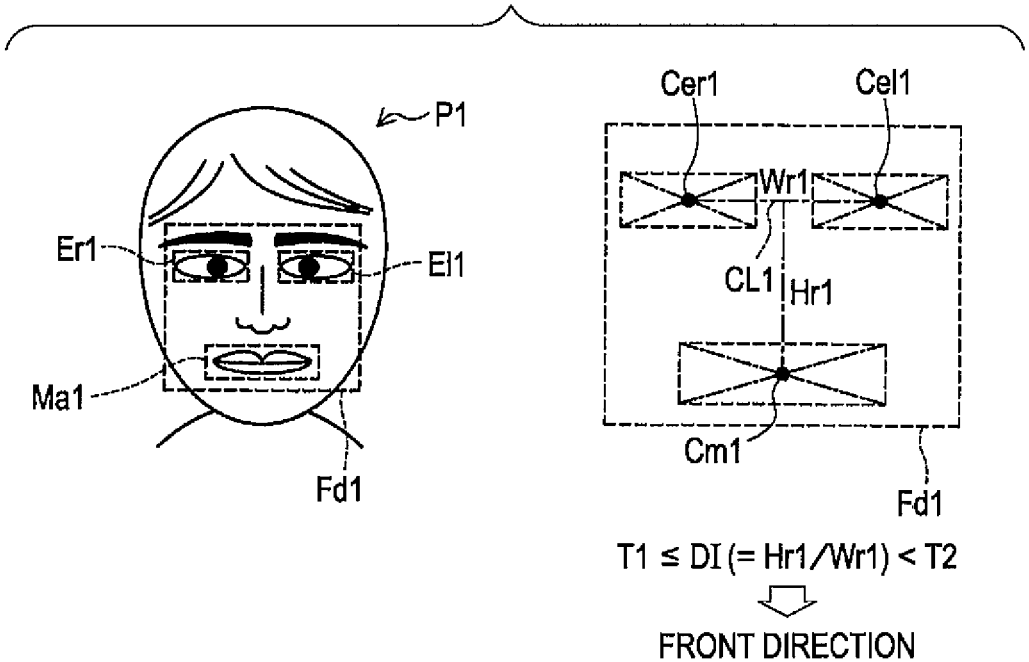
FIG. 8A is an explanatory diagram showing an example of a result estimated as a front direction when estimating a face direction.

FIG. 8A is an explanatory diagram showing an example of a result estimated as a front direction when estimating a face direction. In FIG. 8A, since the judgment index DI is not less than the threshold T1 and is less than the threshold T2, the face direction of the person P1 is estimated as the "front direction". Then, in this case, the "front direction" as a value indicating a direction of swing of the face and "0°" as a value indicating a degree (angle) of swing of the face are stored in the internal memory 120 in association with values (coordinate of each vertex of the rectangular areas) indicating the face area Fd1. The angle of swing of the face can be determined by means of an angular table in which the judgment indexes DI are associated with angles. In the angular table, an angle of swing per judgment index DI is preliminarily obtained and set by experiments, and stored in the internal memory 120.

Figure 8B:
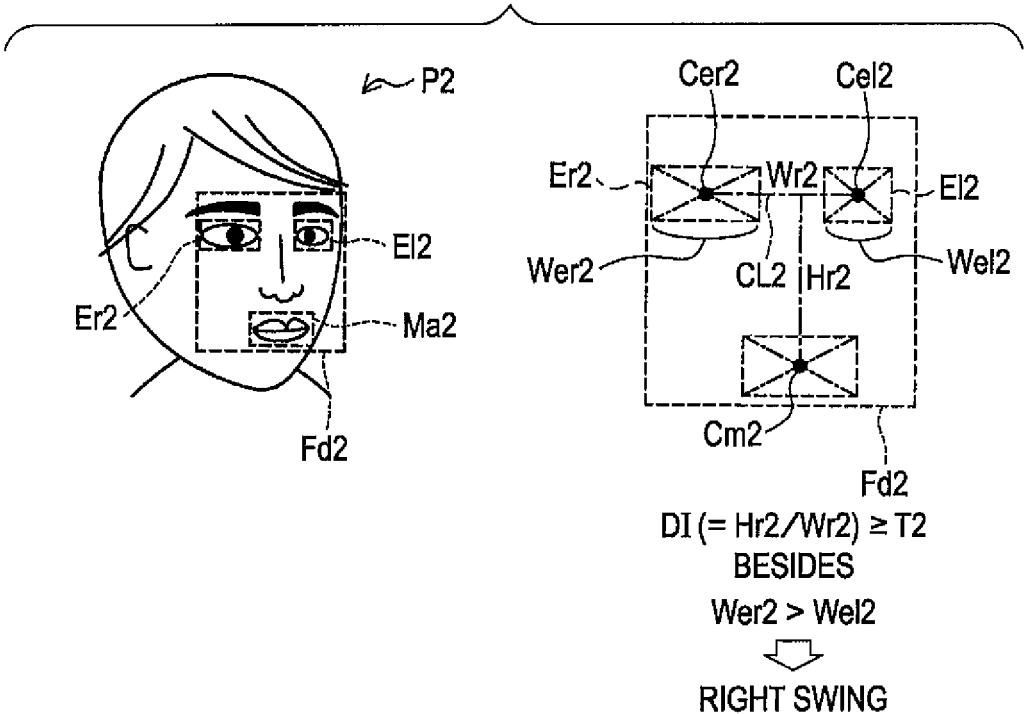
FIG. 8B is an explanatory diagram showing an example of a result estimated as right swing when estimating the face direction.

FIG. 8B is an explanatory diagram showing an example of a result estimated as a right swing. In FIG. 8B, since the judgment index D1 is not less than T2, the face direction of the person P2 is estimated as the "right direction" or the "left direction". The face direction estimating section 230 estimates whether the face is swung in the right or left direction by, for example, comparing a width Wer of the right eye area Er and a width Wel of the left eye area El. That is, when the width Wer of the right eye area Er is larger than the width Wel, it is estimated that the face is swung in the right direction, and when the width Wel of the left eye area El is larger than the width Wer, it is estimated that the face is swung in the left direction. In FIG. 8B, since a width Wer2 of the right eye area Er2 is larger than a width Wel2 of the left eye area El2, the face direction is estimated as the "right swing". Moreover, on the basis of the obtained judgment index D1, the face direction estimating section 230 can obtain the swing angle (+30°) of the face image of the person P2 with reference to an angular table. Then, the face direction estimating section 230 stores "right swing" and "30°" in the internal memory 120 in association with the face area Fd2.

In step S700 (FIG. 2), the division-point movement table determining section 270 determines a division-point movement table 420 to use in a transformation process of step S800. The division-point movement table 420 includes plural tables previously prepared in accordance with a direction and degree of swing of the face. The division-point movement table determining section 270 selects and determines a table to be used for the transformation process from these plural tables. For example, if the face direction is the front direction (degree of swing=0°), a division-point movement table prepared for the front direction (0°) is selected. If the face is swung in the right direction and the degree of swing is +30°, a division-point movement table prepared for the right swing of +300 is determined. Details for the division-point movement table 420 are described below. Then, when the division-point movement table is determined, the transformation process for a face image is executed (step S800).

Figure 9:
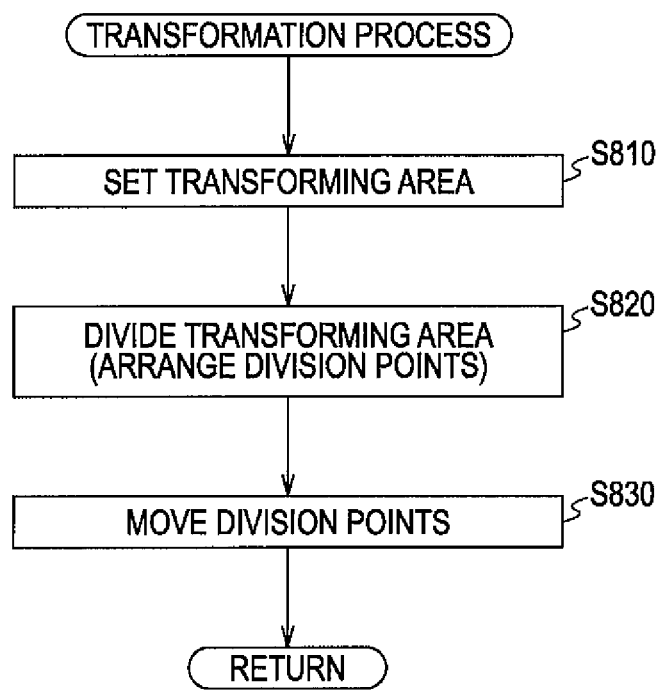
FIG. 9 is a flowchart showing a detailed procedure of a transformation process.

FIG. 9 is a flowchart showing a detailed procedure of the transformation process in step S800. In step S810, the transforming area setting section 240 (FIG. 1) sets a transforming area, which is an area to be transformed in order to correct the face shape in the target image. Moreover, the transforming area corresponds to a correction target area in the claims.

Figure 10:
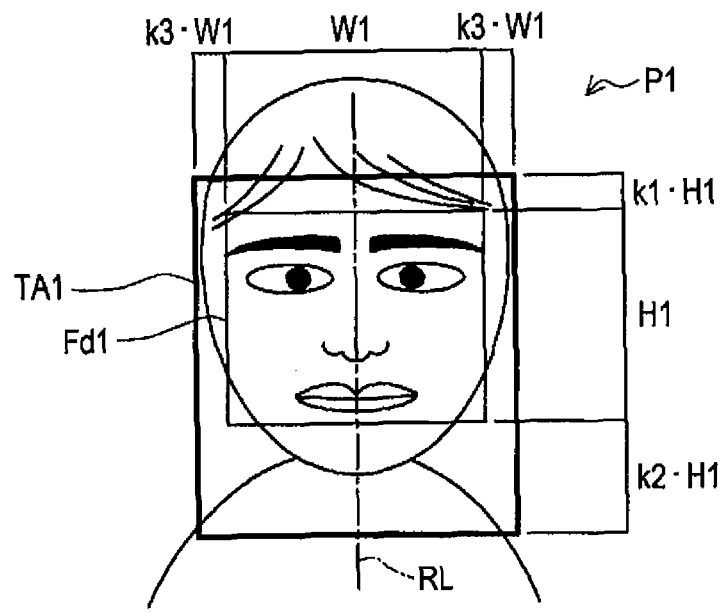
FIG. 10 is an explanatory diagram showing an example of a method for setting a transforming area.

FIG. 10 shows an example of a method for setting a transforming area for the face area Fd1. In FIG. 10, a rectangle (TA1) with a thick solid line shows a transforming area TA1 set for the face area Fd1. A reference line RL defines the height (vertical) direction of the face area Fd1 and shows the center of the width (horizontal) direction of the face area Fd1. In other words, the reference line RL is a straight line that passes the weighted center of the rectangular face area Fd1 and is parallel to border lines along the height (vertical) direction of the face area Fd1.

In this embodiment, as shown in FIG. 10, the transforming area TA1 is set as an area obtained by extending (or shortening) the face area Fd1 in a height direction parallel to the reference line RL and in a width direction perpendicular to the reference line RL. Specifically, assuming that the length of the height (longitudinal) direction of the face area Fd1 is H1 and the size of the width (transversal) direction of the face area Fd1 is W1, the area obtained by extending the face area Fd1 to the size of k1·H1 in an upper direction, to the size of k2·H1 in a lower direction, and respectively to the size of k3·W1 in left and right directions is set as the transforming area TA1. k1, k2 and k3 are predetermined coefficients. When the transforming area TA1 is set in this way, the reference line RL that is a straight line parallel to an outline of the height (longitudinal) direction of the face area Fd1 becomes a straight line also parallel to an outline of the height (longitudinal) direction of the transforming area TA1. Moreover, the reference line RL is a straight line dividing the width (transverse length) of the transforming area TA1 into one-half.

As illustrated in FIG. 10, the transforming area TA1 is set to generally include parts of the image from a jaw to a forehead in the height direction and from the left cheek to the right cheek in the width direction. Coefficients k1, k2 and k3 are preliminarily obtained and set by experiment so that a correction area generally includes these parts of the image.

In step S820 (FIG. 9), the transforming area dividing section 250 divides the transforming area set in step S810 into plural small areas.

Figure 11:
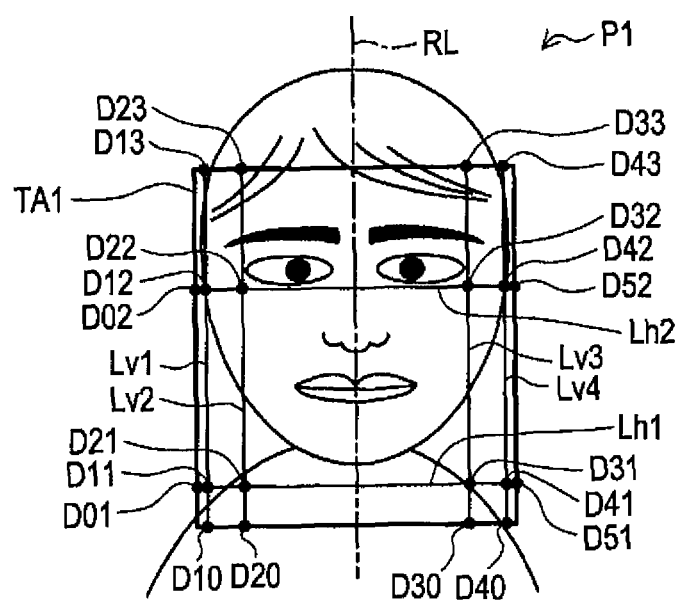
FIG. 11 is an explanatory diagram showing an example of a method for dividing the transforming area into small areas.

FIG. 11 is an explanatory diagram showing an example of a method for dividing the transforming area into the small areas. In FIG. 11, the face area Fd1 and the transforming area TA1 of FIG. 10 are illustrated. The transforming area dividing section 250 arranges plural division points D on the transforming area TA1, and divides the transforming area TA1 into plural small areas by means of straight lines connecting the division points D.

Here, an aspect of the arrangement of the division points D (the number and locations of the division points D) is defined by the division-point arrangement pattern table 410 (FIG. 1). The transforming area dividing section 250 arranges the division points D with reference to the division-point arrangement pattern table 410. In addition, in the present embodiment, the size of the face is decreased to slim the face shape, and an arrangement pattern of the division points D is predefined in the division-point arrangement pattern table 410 according to an aspect corresponding to the decrease of the face size.

In FIG. 11, the division points D are arranged on intersections between horizontal division lines Lh and vertical division lines Lv and intersections between the horizontal division lines Lh and the vertical division lines Lv and the outline of the transforming area TA1. The horizontal division line Lh and the vertical division line Lv are reference lines for arranging the division points D in the transforming area TA1. In the present embodiment, two horizontal division lines Lh perpendicular to the reference line RL and four vertical division lines Lv parallel to the reference line RL are set. The two horizontal division lines Lh are referred to as Lh1 and Lh2 in order from the lower side of the transforming area TA1, and the four vertical division lines Lv are referred to as Lv1, Lv2, Lv3, and Lv4 in order from the left side of the transforming area TA1.

The horizontal division line Lh1 is arranged at a lower side of the jaw image in the transforming area TA1, and the horizontal division line Lh2 is arranged near the eye image. The vertical division lines Lv1 and Lv4 are arranged outside the image of the cheek lines, and the vertical division lines Lv2 and Lv3 are arranged outside the tails of the eyes. In addition, the horizontal division lines Lh and the vertical division lines Lv are arranged in accordance with a correspondence relation with the size of the transforming area TA1 preset in order that positional relationships between the horizontal division lines Lh and the vertical division lines Lv and the image become the above-described positional relationships.

The division points D are arranged at the intersections between the horizontal division lines Lh and the vertical division lines Lv and the intersections between the horizontal division lines Lh and the vertical division lines Lv and the outline of the transforming area TA1. As illustrated in FIG. 11, the division points D located on the horizontal division line Lhi (i=1 or 2) are referred to as $D0i$, $D1i$, $D2i$, $D3i$, $D4i$, and $D5i$, respectively, in sequence from the left side. For example, the division points D located on the horizontal division lines Lh1 are referred to as D01, D11, D21, D31, D41, and D51. Similarly, the division points D located on the vertical division line Lvj (j=any of 1 to 4) are referred to as $Dj0$, $Dj1$, $Dj2$, and $Dj3$, respectively, in sequence from the bottom. For example, the division points D located on the vertical division lines Lv1 are referred to as D10, D11, D12, and D13. As illustrated in FIG. 11, the arrangement of the division points D in this embodiment is a symmetric arrangement with respect to the reference line RL.

The transforming area dividing section 250 divides the transforming area TA1 into the plural small areas by straight lines connecting the arranged division points D (in other words, the horizontal division lines Lh and the vertical division lines Lv). In FIG. 11, the transforming area TA1 is divided into 15 small rectangular areas.

In step S830 (FIG. 9), the divided area transforming section 260 (FIG. 1) moves the positions of the division points D in accordance with the division-point movement table determined in step S700 (FIG. 2) and transforms the small areas to transform the transforming area.

FIG. 12 is a division-point movement table (table for 0°) for a face direction that is a front direction (degree of face swing 0°). In each table constituting the division-point movement table 420, a movement distance along the H direction perpendicular to the reference line RL and a movement distance along the V direction parallel to the reference line RL are set for each division point D11-D42 (FIG. 11) arranged in step S820. In the present embodiment, the unit for this movement distance is pixel pitch PP of the target image. In case of the H direction, a movement distance to the right side is expressed as a positive value and a movement distance to the left side is expressed as a negative value, and in case of the V direction, a movement distance to the upper side is expressed as a positive value and a movement distance to the lower side is expressed as a negative value. For example, in FIG. 12, in case of the division point D11 in the table tb0 for 0°, a movement distance of 7 times of the pixel pitch PP is set to the right side along the H direction, and a movement distance of 14 times of the pixel pitch PP is set to the upper side along the V direction. The movement distances of the division point D22 are set as 0 in both of the H and V directions.

Figure 13:
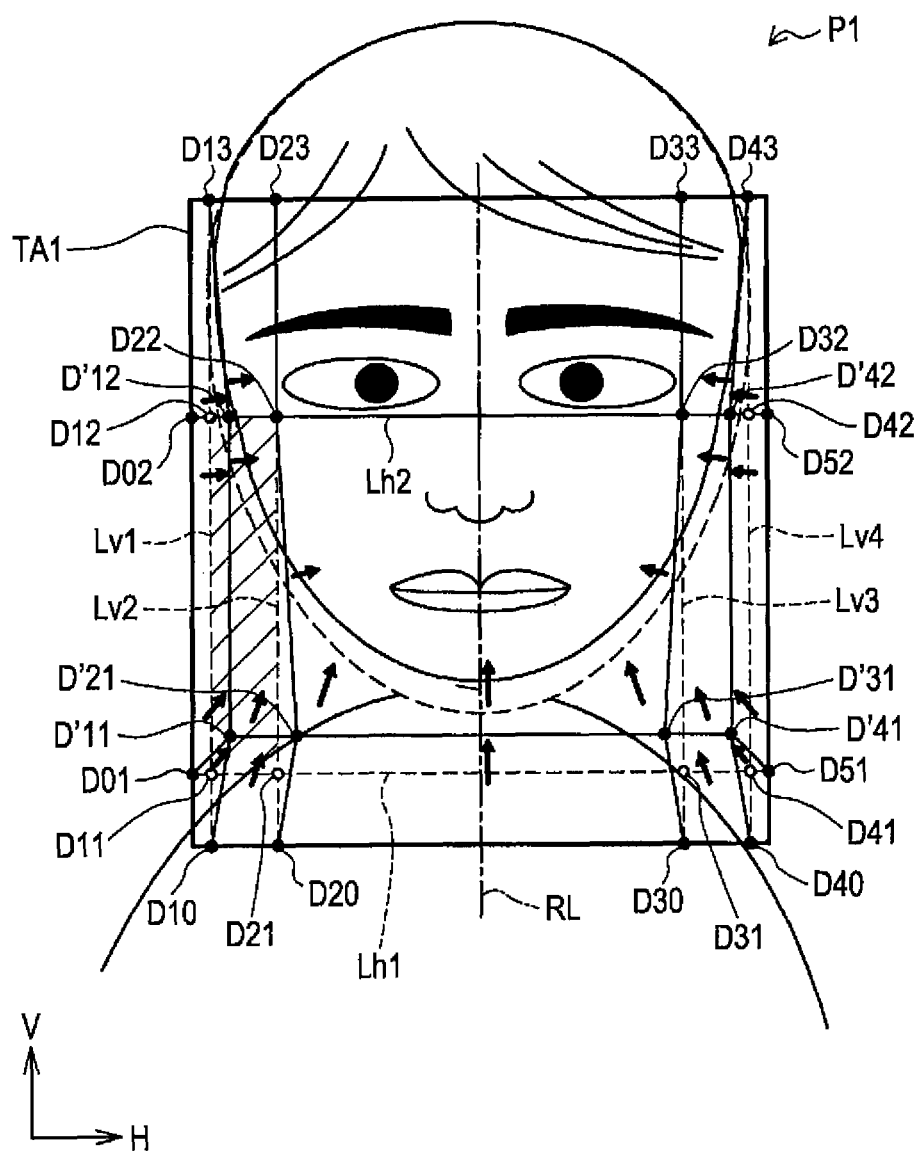
FIG. 13 is an explanatory diagram showing an example of position movement for division points according to the table for 0° of FIG. 12.

FIG. 13 is an explanatory diagram showing an example of position movement of the division points D according to the table tb0 for 0° of FIG. 12. FIG. 13 shows a concrete modified aspect when the positions of the division points D in the transforming area TA1 are moved and transformed. The divided area transforming section 260 performs a transformation process for each small area constituting the transforming area TA1, so that the images in the small areas before the position movement of the division points D become images in small areas newly defined by the position movement of the division points D. For example, in FIG. 13, the image in the hatched small area having vertexes of the division points D11, D21, D22 and D12 is transformed into an image in a small area having vertexes of division points D'11, D'21, D22 and D'12. Details of the transformation process for the small areas are described below.

As illustrated in FIG. 13, as a result of the movement of the division points in step S830, the division points D11, D21, D31 and D41 arranged in a V direction parallel to the reference line RL on the horizontal division line Lh1 are moved upward, but the division points D12, D22, D32 and D42 arranged on the horizontal division line Lh2 are not moved (see FIG. 12). Therefore, the image located between the horizontal division lines Lh1 and Lh2 is reduced in the V direction. Since the horizontal division line Lh1 is arranged below the image of jaw and the horizontal division line Lh2 is arranged just below the image of eyes, the image of the portion from the jaw to the bottom of the eyes among the face images is reduced in the V direction according to the face shape correction of the present embodiment. As a result, the line of the jaw in the image is moved upward.

In the meantime, with reference to the H direction perpendicular to the reference line RL, the division points D11 and D12 arranged on the vertical division line Lv1 are moved to the right, and the division points D41 and D42 arranged on the vertical division line Lv4 are moved to the left (see FIG. 12). Furthermore, the division point D21 arranged on the horizontal division line Lh1 among the two division points D arranged on the vertical division line Lv2 is moved to the right, and the division point D31 arranged on the horizontal division line Lh1 among the two division points D arranged on the vertical division line Lv3 is moved to the left (see FIG. 12). Therefore, an image located on the left side of the vertical division line Lv1 is enlarged to the right in the H direction, and an image located on the right side of the vertical division line Lv4 is enlarged to the left. Moreover, an image located between the vertical division lines Lv1 and Lv2 is reduced or moved to the right in the H direction, and an image located between the vertical division lines Lv3 and Lv4 is reduced or moved to the left in the H direction. Furthermore, an image located between the vertical division lines Lv2 and Lv3 is reduced in the H direction with the position of the horizontal division line Lh1 as a center.

As described above, the vertical division lines Lv1 and Lv4 are arranged outside the image of the cheek line, and the vertical division lines Lv2 and Lv3 are arranged outside the image for the tails of eyes. Therefore, in this embodiment, images located out of both eye tails among the face images are reduced in the H direction as a whole. In particular, reduction ratios in the vicinity of the jaw become high. As a result, the face shape in the images totally becomes narrow in the width direction. When the above-described transformation aspects in the H and V directions are synthesized, the face shape of the person P1 included in the transforming area TA1 is slimmed (a small face) by means of the process in step S830.

Here, the division points D (for example, the division point D10 of FIG. 13) located on the outline of the transforming area TA1 are not moved in the printer 100 so that the boundary between the internal and external images of the transforming area TA1 is natural. Therefore, in each table constituting the division-point movement table 420, movement distances of the division points D located on the outer frame of the transforming area are not set. For example, in the table tb0 (see FIG. 12) for 0°, the movement distances of the division points D (D10, D20 or the like) located on the outer frame of the transforming area TA1 are not set.

Moreover, in the table tb0 for 0°, a movement distance of each division point D is set such that all combinations (for example, a combination of the division points D11 and D41) of two division points D symmetrically positioned to the reference line RL hold symmetrical position relationships to the reference line RL even after the division points D are moved. However, in tables other than the table tb0 for 0° among the division-point movement tables 420, a movement distance of each division point D in two division points D symmetrically positioned to the reference line RL is set in order not to be a symmetrical position relationship to the reference line RL after the movement of the division point D.

Figure 14:
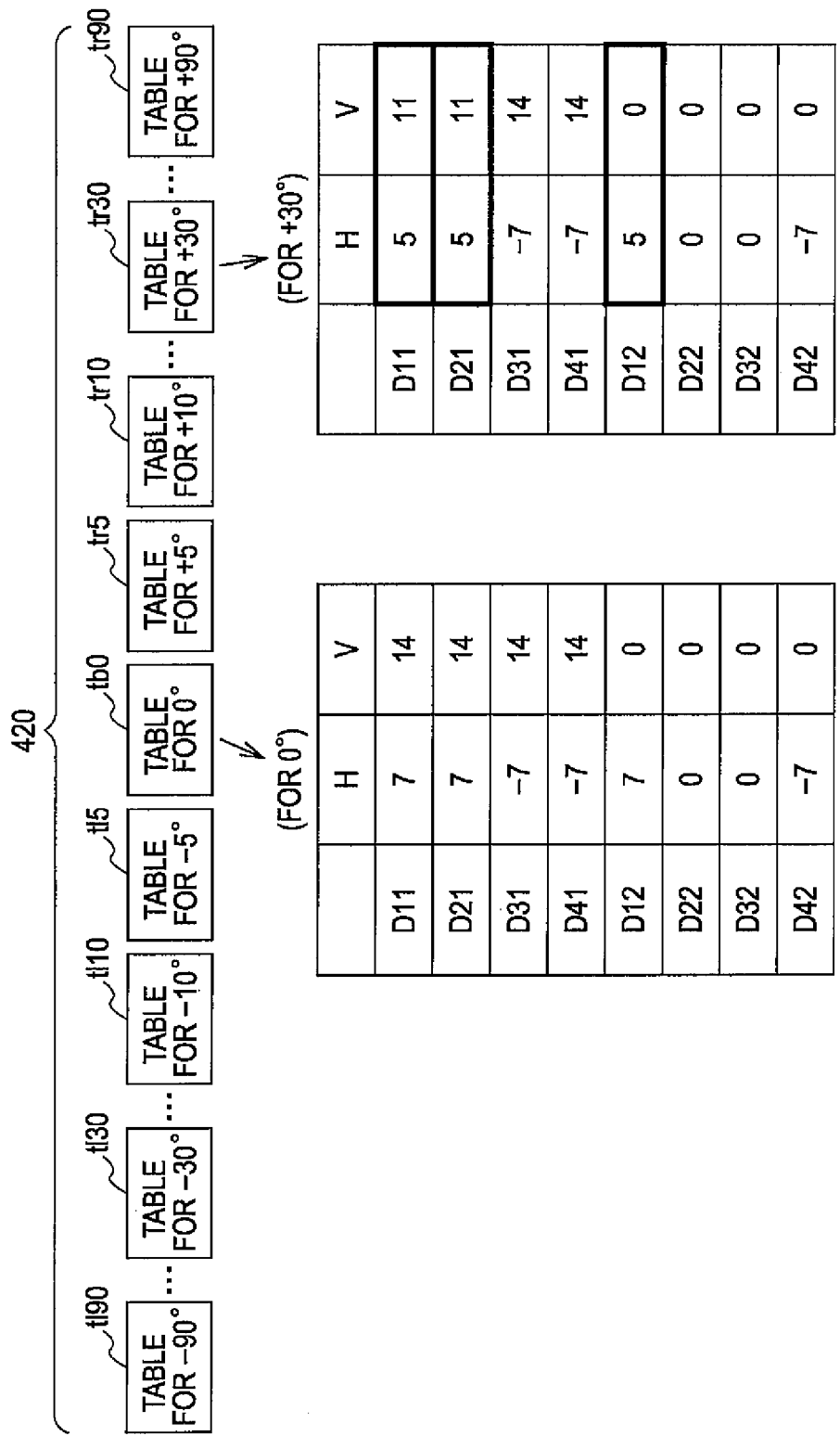
FIG. 14 is a detailed illustration of a division-point movement table according to the first embodiment.

FIG. 14 illustrates a division-point movement table 420 according to the first embodiment. The division-point movement table 420 includes plural tables prepared in accordance with a direction and degree of swing of the face. In addition to table tb0 for 0°, table 420 includes a table tr5 for +5°, a table tr10 for +10°, a table tr30 for +30°, a table tr90 for +90°, a table tl5 for −5°, a table tl10 for −10°, a table tl30 for −30° and a table tl10 for −90°. Detailed setting contents of the table tb0 for 0° and the table tr30 for +30° are shown. The details of the table tb0 for 0° are equal to the ones in FIG. 12. In FIG. 14, the division-point movement table is prepared every 5° when the face is swung in a left direction (a minus angle) and in a right direction (a plus angle). The tables may be prepared every arbitrary angle without being limited as every 5°.

In step S700, a table to be used in the transformation process (step S800) is set. In the present embodiment, the table tb0 for 0° is determined in step S700 when the face is swung in an upper or a lower direction.

As illustrated in FIG. 14, the movement distances of the division points D11, D21 and D12 among the movement distances of the respective division points D set in the table tr30 for +30° are smaller than the movement distances in the table tb0 for 0°. Specifically, for division points D11 and D21, the movement distance (H, V) in the table tb0 for 0° is (7, 14) and the movement distance (H, V) in the table tr30 for +30° is (5, 11). For division point D12, the movement distance (H, V) in the table tb0 for 0° is (7, 0) and the movement distance (H, V) in the table tr30 for +30° is (5, 0). On the other hand, the movement distances of the division points D31, D41 and D42 are the same in the table tr30 for +30° and the table tb0 for 0°. In addition, all the movement distances of the division points D22 and D32 in the two tables of tb0 and tr30 are zero. Here, the division points D11, D21 and D12 are located at the left side in the transforming area, and the division points D31, D41 and D42 are located at the right side in the transforming area (see FIG. 13). Therefore, in the combinations (D11 and D41, D21 and D31, and D12 and D42) of two division points D symmetrically positioned to the reference line RL in the table tr30 for +30°, the movement distances of the division points at the opposite sides (to the left side) to each face direction are smaller than the movement distances of the division points at the same sides (to the right side) as the face direction.

FIG. 15 is an explanatory diagram showing examples of movement of the division points D when the table tb0 for 0° and the table tr30 for +30° of FIG. 14 are respectively applied. In FIG. 15, the upper portion shows an application example of the table tb0 for 0°, and the lower portion shows an application example of the table tr30 for +30°. The rectangular frame surrounded by a thick solid line in the lower portion shows the transforming area TA2 set on the basis of the face area Fd2 (see FIG. 5) of the person P2.

As described above, the transforming area TA1 for the person P1 is transformed into a bilaterally symmetric pattern (see FIG. 13). On the other hand, the right area in the transforming area TA2 for the person P2 is transformed (reduction of the face size) in a degree substantially the same as the area on the transforming area TA1, but the transformation (reduction of the face size) degree for the left area is smaller than that for the transforming area TA1. As described above, the reason is that the movement distances of the division points D11, D21 and D12 located toward the left side in the table tr30 for +30°, which is used in the transformation of the transforming area TA2, are small compared to the movement distances in the table tb0 for 0°.

Figure 16:
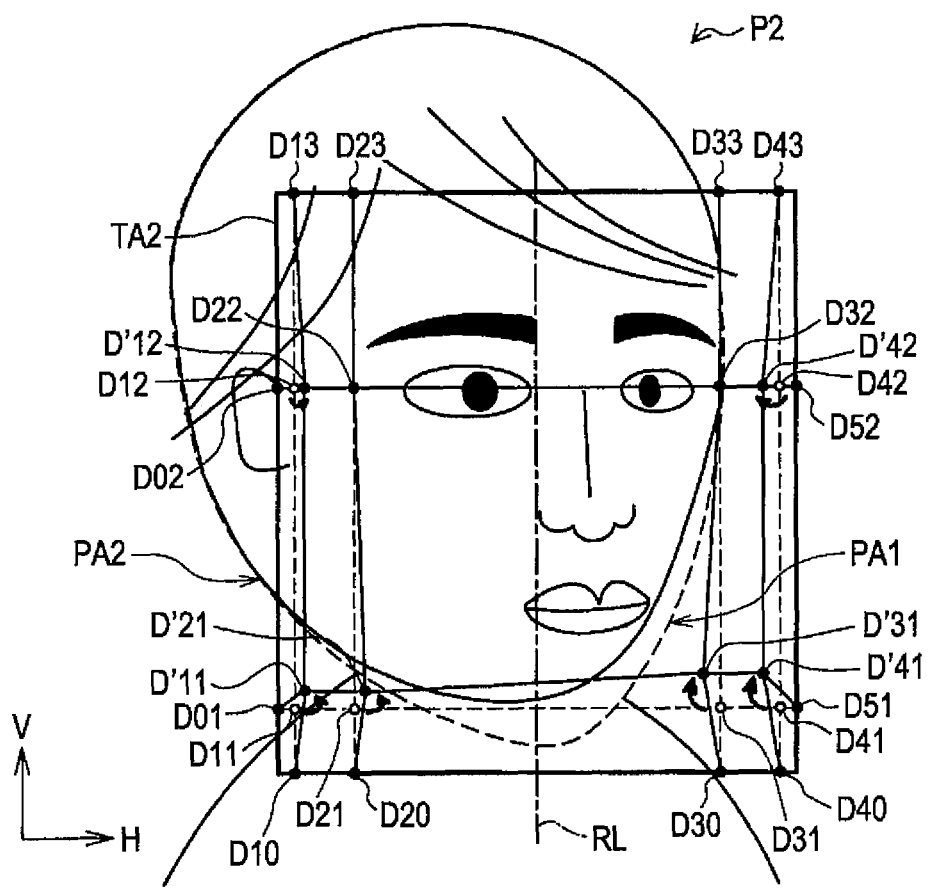
FIG. 16 is an explanatory diagram showing a concrete transformation aspect for a transforming area when the table for +30° is used.

FIG. 16 is an explanatory diagram showing a concrete transformation aspect for a transforming area TA2 when the table tr30 for +30° is used. In FIG. 16, the outline of the person P2 before the transformation is shown by a dashed line for convenient comparison. Similarl to the transformation of the transforming area TA1 for the person P1 (FIG. 13), the face shape of the person P2 in the transforming area TA2 for the person P2 is also slimmed (reduced in face size). An outline PA1 from the right cheek to the jaw has a comparatively high transformation degree, while an outline PA2 from the left cheek to the jaw has a comparatively low transformation degree. By such transformation, the face shape is slimmed to look good without showing an unnatural face image even when the face of the person P2 is swung in the right direction.

Figure 17:
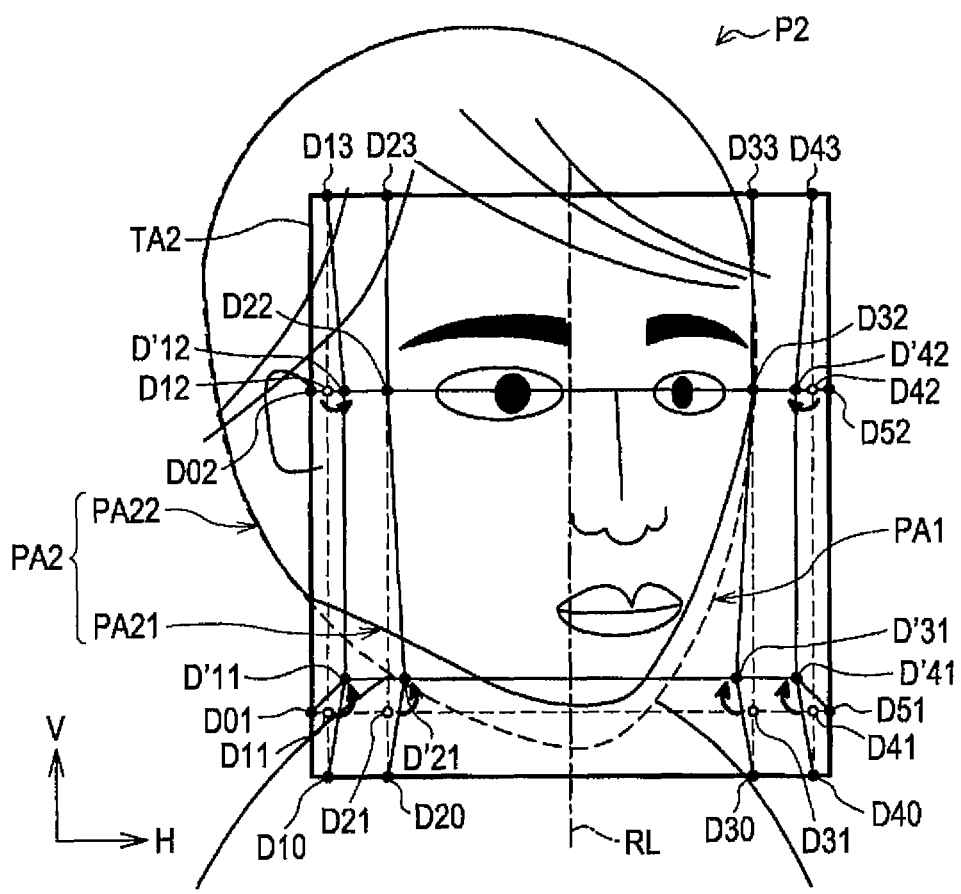
FIG. 17 is an explanatory diagram showing a concrete aspect for the transforming area when the table for 0° is used as a comparative example.

FIG. 17 is an explanatory diagram showing a concrete aspect of the transforming area TA2 when the table tb0 for 0° is used as a comparative example. The outline of a dashed line in FIG. 17 indicates the same meaning as the one in FIG. 16. Only the table tb0 for 0° is prepared as the division-point movement table 420, and the face image after transformation is unnatural as illustrated in FIG. 17 when the table tb0 for 0° is applied to the transforming area TA2. Specifically, a part of the outline PA2 at the left side seems to be unnaturally dented. The reason is that an outline PA21 included in the transforming area TA2 is transformed in a comparatively large degree, but an outline PA22 not included in the transforming area TA2 is not transformed, in the outline PA2.

In addition, even when the transforming area TA2 is set so as to include all the outline PA2, the face image after transformation is unnatural. An expected good image cannot be obtained because the face is swung in the right direction and a portion different from a planned portion on the outline of the face becomes a transformation target in the transformation process (step S800).

As understood from this, the face image after transformation is easily deteriorated as the degree of swing of the face increases. Therefore, in the printer 100, movement distances of the division points D in the tables constituting division-point movement table 420 are set so that the transformation degree becomes small as the degree of swing of the face increases.

Figure 18:
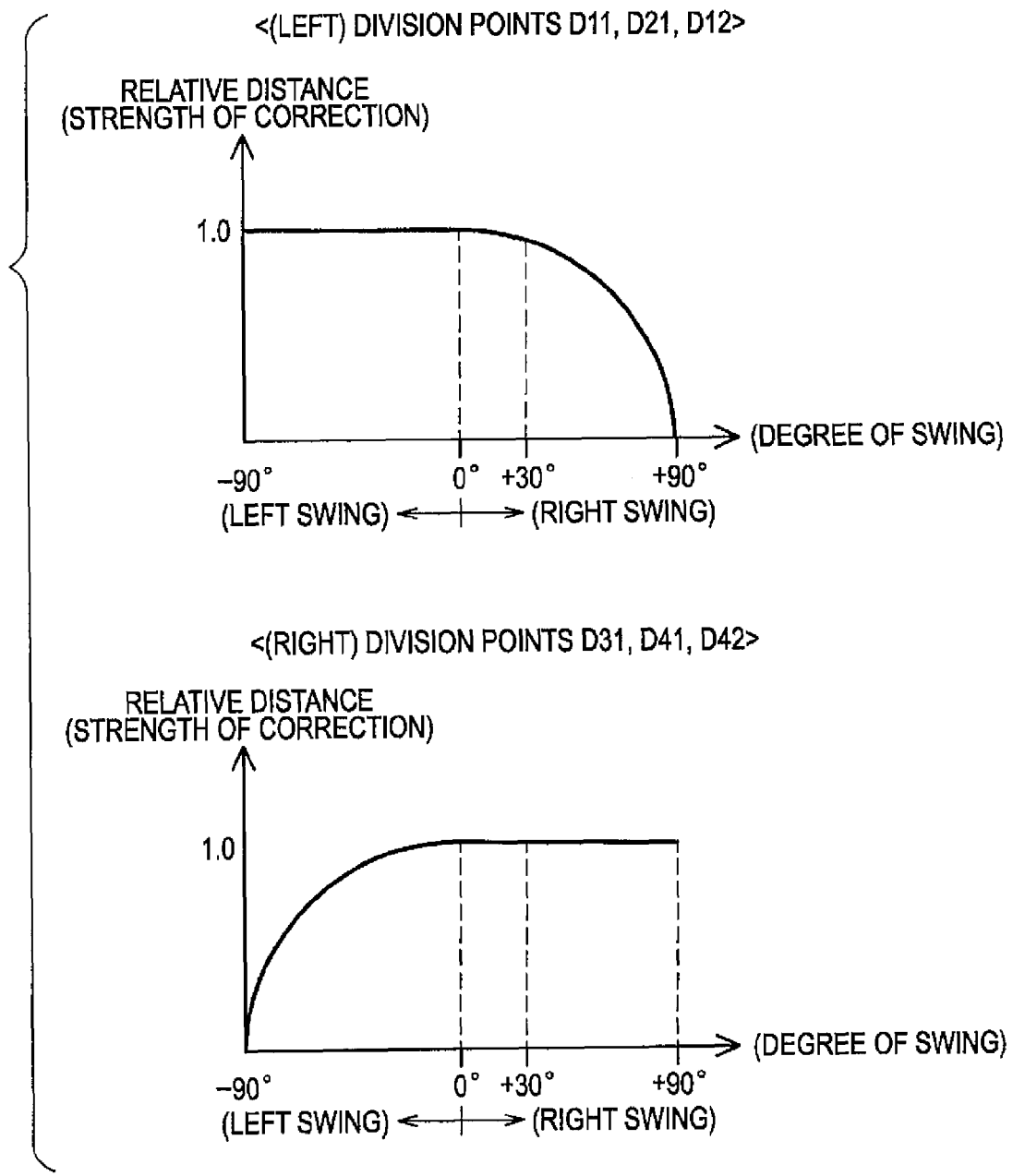
FIG. 18 is an explanatory diagram schematically showing movement distances of the division points set in the division-point movement table of FIG. 14.

FIG. 18 is an explanatory diagram schematically showing movement distances of the division points D set in the tables constituting the division-point movement table 420. In FIG. 18, the upper graph shows movement distances of the division points D11, D21 and D12 located at the left side, and the lower graph shows movement distances of the division points D31, D41 and D42 located at the right side. In the upper and lower graphs, the horizontal axis represents a degree (angle) of swing of the face, and the vertical axis represents movement distance. For convenient description, the "movement distance" in FIG. 18 is a relative movement distance using the movement distance in the front direction (0°) of the face as a reference (1.0). Moreover, this movement distance shows a size of a vector obtained by adding a movement distance in the H direction and a movement distance in the V direction.

The movement distances of the division points D11, D21 and D12 located at the left side decrease as the degree of swing increases when the face is swung in the right direction (0° to +90°). When the face is swung in the left direction (−90° to 0°), the movement distances become constant regardless of the degrees of swing.

On the other hand, when the face is swung in the right direction, the movement distances of the division points D31, D41 and D42 located at the right side become constant regardless of degrees of swing. When the face is swung in the left direction, the movement distances decrease as the degrees of swing increase.

By setting the movement distances of the division points D in this manner, the transformation degree for an area opposed to the face direction within the transforming area is reduced as the degrees of swing increase. As the degrees of swing increase, a possibility for transforming an outline portion which is not to be transformed in the opposite area to the face direction increases. Therefore, by such a configuration, the face image after transformation can be restrained from being unnatural regardless of the size of the degree of swing. Moreover, similarl to the table tr30 (FIG. 14) for +30°, the other tables except the table tb0 for 0° are set so that the face direction and movement distances of the division points on the opposite side are smaller than the face direction and movement distances of the division points on the same side. Therefore, since there is a high possibility that the outline portion expected to be transformed is transformed at the same side as the face direction, a relatively large transformation degree can be set and the face size can be reduced to an expected degree. On the other hand, since there is a high possibility that the outline portion which is not expected to be transformed is transformed at the side opposite to the face direction, a relatively small transformation degree can be set and the face image after the transformation can be restrained from being unnatural.

As described above, since the transforming area is transformed in accordance with a degree of swing of the face in the printer 100 of the first embodiment, a face image after transformation having a natural and small-size face that looks good can be realized. Moreover, the transformation degree of the area on the opposite side of the face direction is small compared to the transformation degree of the area on the same side as the face direction. Therefore, while the face image after transformation is restrained from being unnatural, the face size for at least the outline portion located at the same side as the face direction is reduced to an expected degree.

A3. Details of Transformation Process for Image Including Small Areas

Figure 19:
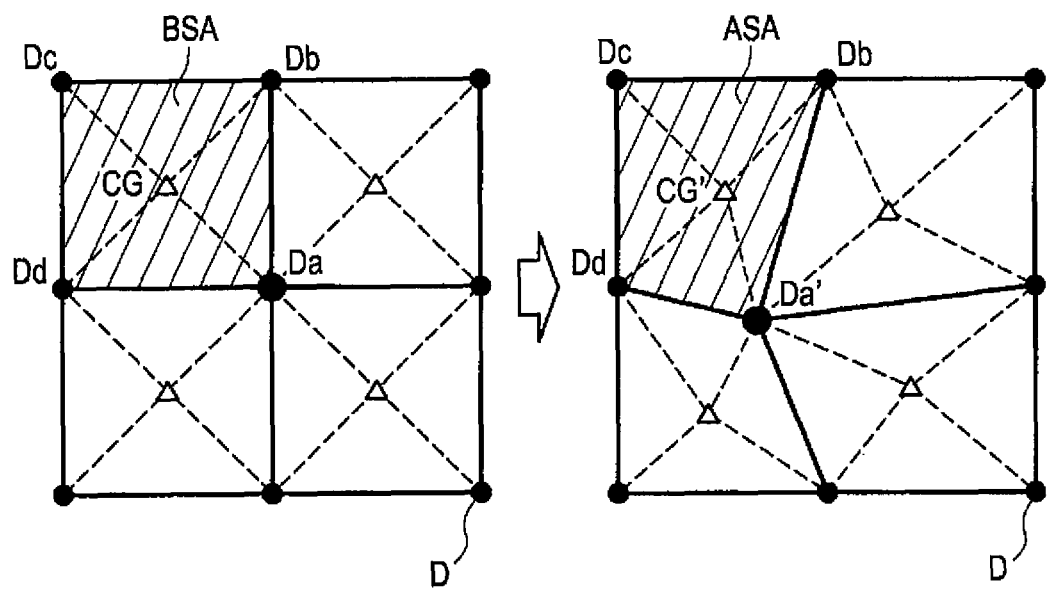
FIG. 19 is an explanatory diagram conceptually showing the transformation process for an image including small areas.

FIG. 19 is an explanatory diagram conceptually showing the transformation process for an image including small areas, which is executed in step S830. In FIG. 19, the division points D are shown by black circles. In order to simplify the description, four small areas respectively show a state before the division points D are moved at the left side, and a state after position of the division points D are moved to the right. In FIG. 19, the central division point Da is moved to a division point Da', and the other division points D are not moved. According to this, for example, an image of a small rectangular area (hereinafter, also referred to as "an attended small area before transformation BSA") having the division points Da, Db, Dc and Dd before the movement of the division points D as the vertexes is transformed into an image of a small rectangular area (hereinafter, also referred to as "an attended small area after transformation ASA") having the division points Da', Db, Dc and Dd as the vertexes.

In the present embodiment, a small rectangular area is divided into four triangular areas by means of the weighted center CG of the small area, and the transformation process for an image is performed in a triangular area unit. In FIG. 19, the attended small areas before the transformation BSA are divided into four triangular areas using the weighted center CG of the attended small areas before the transformation BSA as one of the vertexes. Similarly, the attended small areas after the transformation ASA are divided into four triangular areas using the weighted center CG' of the attended small areas after the transformation ASA as one of the vertexes. Then, an image transformation process is performed on each triangular area corresponding to each state before and after the movement of the division point Da. For example, the image of the triangular area using the division points Da and Dd in the attended small areas before the transformation BSA and the weighted center CG as the vertexes is transformed into the image of the triangular area using the division points Da' and Dd in the attended small areas after the transformation ASA and the weighted center CG' as the vertexes.

Figure 20:
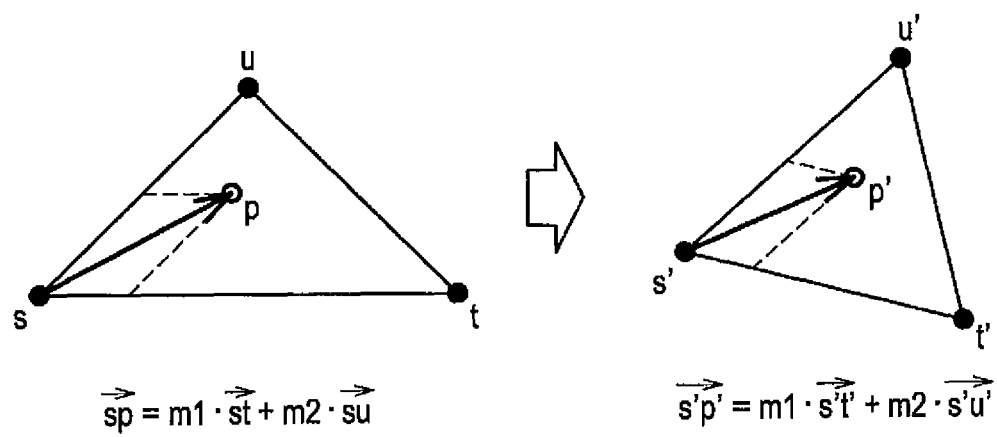
FIG. 20 is an explanatory diagram conceptually showing a method for transforming an image in a triangular area.

FIG. 20 is an explanatory diagram conceptually showing a method for transforming an image in a triangular area. In FIG. 20, an image of a triangular area stu having points s, t and u as vertexes is transformed into an image of a triangular area s't'u' having points s', t' and u' as vertexes. The transformation of the image is performed by computing which position in the image of the triangular area stu before the transformation corresponds to the position of pixels in the image of the triangular area s't'u' after the transformation and using pixel values of the computed positions in the image before the transformation as pixel values in the image after the transformation.

For example, in FIG. 20, the position p' of an attended pixel in the image of the triangular area s't'u' after the transformation corresponds to the position p of a pixel in the image of the triangular stu before the transformation. The position p is computed as described below. First, coefficients m1 and m2 for expressing the position p' of the attended pixel by a sum of a vector s't' and a vector s'u' are computed according to the following equation (1).

[Equation 1]

$$\vec{s'p'} = m1 \cdot \vec{s't'} + m2 \cdot \vec{s'u'} \quad (1)$$

Next, according to the following equation (2), a sum of a vector st and a vector su in the triangular area stu before transformation is computed by means of the computed coefficients m1 and m2, and thus the position p is obtained.

[Equation 2]

$$\vec{sp} = m1 \cdot \vec{st} + m2 \cdot \vec{su} \quad (2)$$

When the position p in the triangular area stu before the transformation is identical with the central pixel position on the image before the transformation, the pixel value of the pixel becomes the pixel value of the image after the transformation. On the other hand, when the position p in the triangular area stu before the transformation is deviated from the central pixel position on the image before the transformation, the pixel value for the position p is computed by means of an interpolation operation such as a bi-cubic method using pixel values of pixels around the position p, and the computed pixel value becomes the pixel value of the image after the transformation.

Since a pixel value of each pixel in the image of the triangular area s't'u' after the transformation is computed as described above, the image transformation process can be performed from the image of the triangular area stu to the image of the triangular area s't'u'. In this way, the divided area transforming section 260 (FIG. 1) defines a triangular area for each small area constituting the transforming area as described above, and then performs the transformation process for the small areas.

B. Second Embodiment

Figure 21:
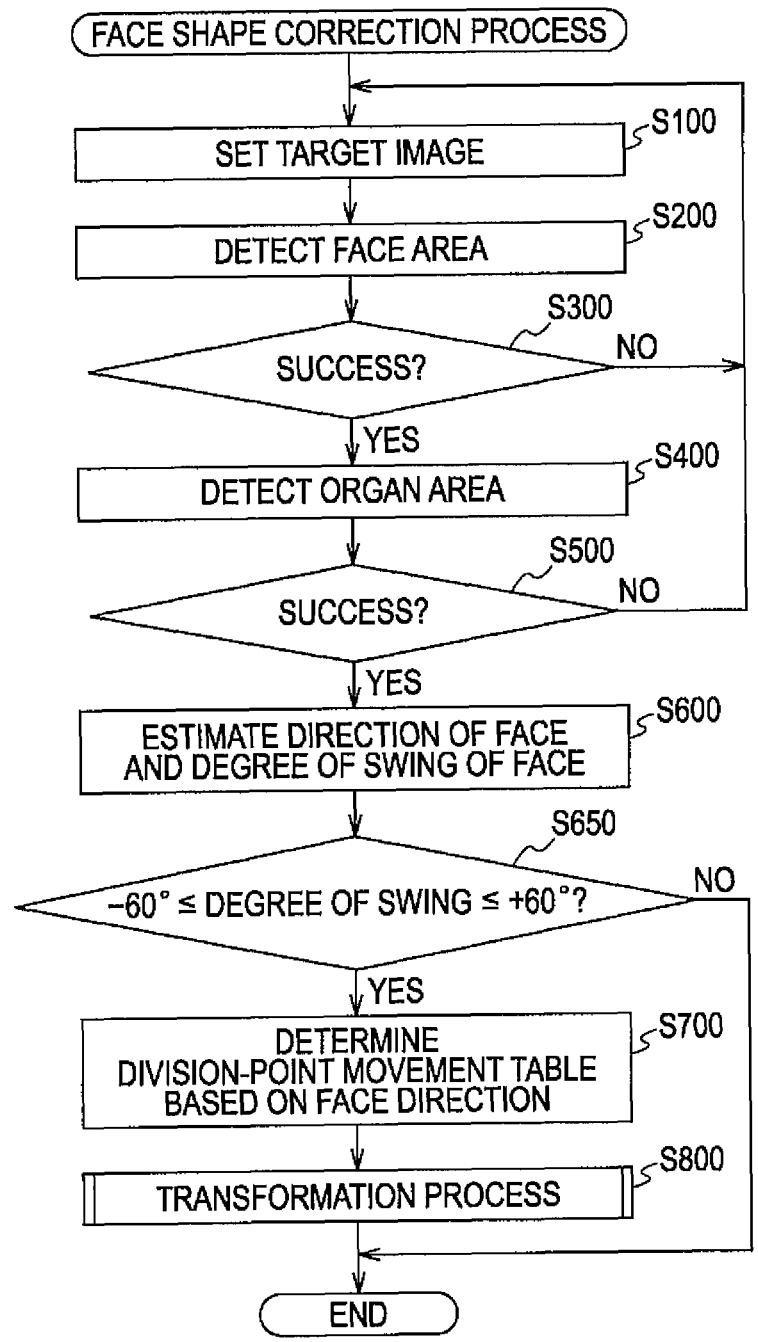
FIG. 21 is a flowchart of a face shape correction process according to a second embodiment.

FIG. 21 is a flowchart of a face shape correction process according to a second embodiment. The process and printer in the second embodiment is different from the process and printer 100 of the first embodiment in that step S650 is added and executed between steps S600 and S700. Otherwise, the first and second embodiments are the same.

Specifically, after estimating a direction and degree of swing of a face in step S600, in step S650, the face direction estimating section 230 decides whether the degree of swing is in a range equal to or larger than −60° and equal to or smaller than +60°. When the degree of swing is in the range, steps S700 and S800 (FIG. 9) are executed. On the other hand, when the degree of swing is smaller than −60° or larger than +60°, steps S700 and S800 are not executed and the face shape correction process is terminated.

The printer of the second embodiment has a similar effect to that of the printer 100 of the first embodiment. Moreover, according to the second embodiment, when the face direction is extremely largely swung in either the left or right direction, it is possible not to reduce the face size. When the face is extremely largely swung in either the left or right direction, there is a concern that an outline portion expected not to be transformed is transformed on the left or right sides of the face image. However, since the face size is not reduced in the second embodiment, the face image is restrained from being transformed into an unnatural face image. In addition, when the degree of swing of the face is large (No in step S650), a predetermined message can be displayed on the display section 150 (FIG. 1). Of course, angles other than "−60°" and "60°" can be adopted as the threshold value used to judge whether the transformation process is executed or not. Moreover, when the degree of swing exceeds a predetermined range, an area not to be transformed (the reduction of the face size) can also be only an area positioned in the opposite direction of the face direction, rather than all areas. Generally, the image processing apparatus of the invention can have a configuration that "an area positioned in the opposite direction of the face direction", in which the outline portion expected not to be transformed is transformed with high possibility, is not transformed (reduced in face size).

C. Third Embodiment

Figure 22:
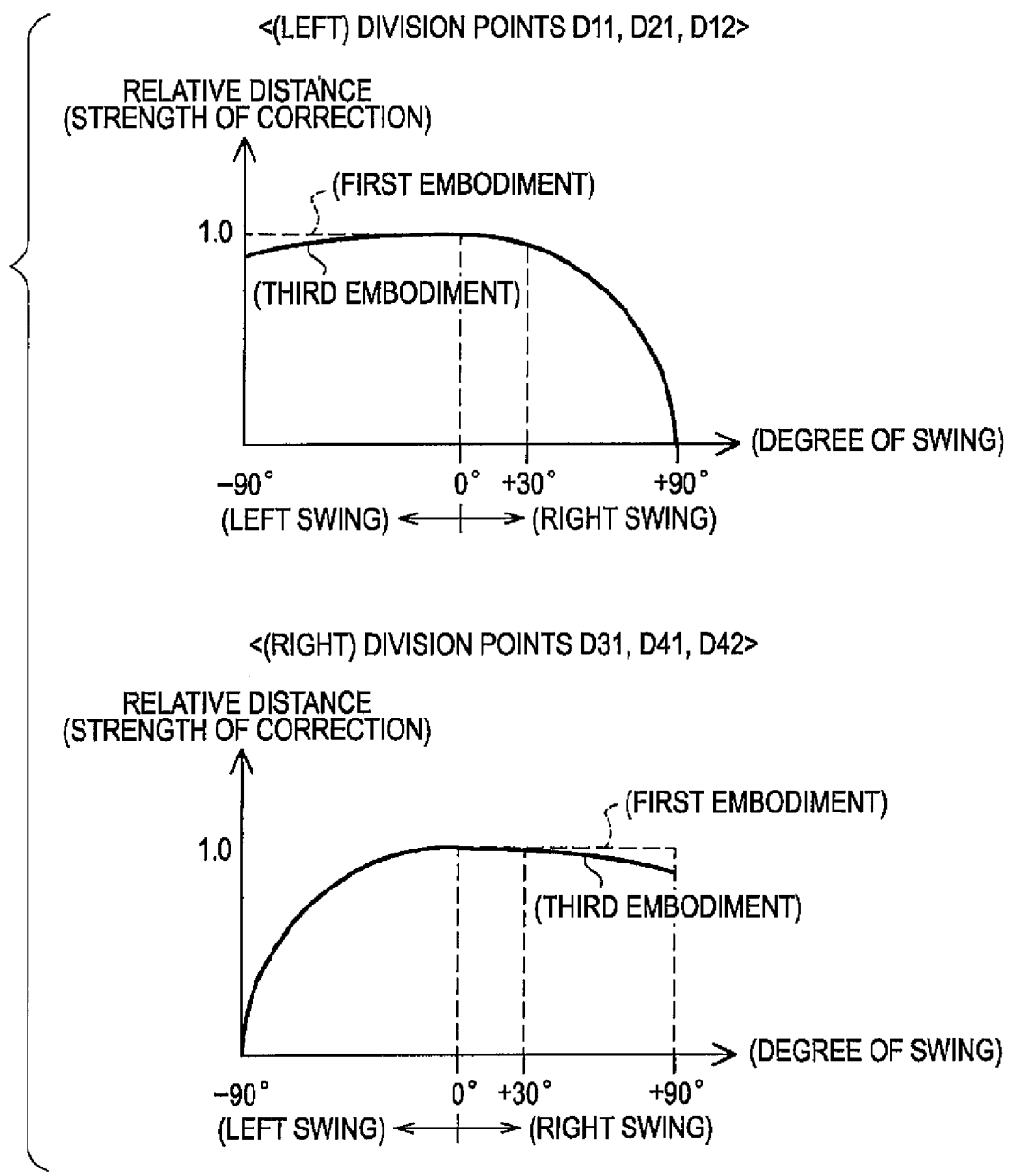
FIG. 22 is an explanatory diagram schematically showing movement distances of division points set in the division-point movement table of FIG. 14 according to a third embodiment.

FIG. 22 is an explanatory diagram schematically showing movement distances of the division points D set in each table constituting the division-point movement table 420 according to a third embodiment. The upper graph in FIG. 22 has a meaning equal to that of the upper graph in FIG. 18, and the lower graph in FIG. 22 has a meaning equal to that of the lower graph in FIG. 18. Moreover, the horizontal and vertical axes in the graphs of FIG. 22 are the same as those in FIG. 18.

The movement distances of the division points D set in each table for a printer in the third embodiment are different from those for printer 100 of the first embodiment. Specifically, the movement distances of the division points D11, D21 and D12 located at the left side are constant (see FIG. 18) in the first embodiment when the face is swung in the left direction, but the movement distances (relative movement distances) decrease in the third embodiment as a degree of swing of the face increases (an angle for the swing increases in the minus side). Movement distances of division points D11, D21 and D12 when the face is swung in the right direction are equal to those in the first embodiment.

On the other hand, movement distances of the division points D31, D41 and D42 located at the right side are constant in the first embodiment when the face is swung in the right direction, but the movement distances (relative movement distances) decrease in the third embodiment as a degree of swing of the face increases (an angle for the swing increases in the plus side). Movement distances of division points D31, D41 and D42 when the face is swung in the left direction are equal to those in the first embodiment.

The printer of the third embodiment shows a similar effect to that of the printer 100 of the first embodiment. Moreover, in the third embodiment, although an outline portion expected not to be transformed is entered into the right side of the transforming area when the face, for example, is swung in the right direction by setting each table as described above, a transformation degree of the outline portion can be comparatively decreased, and thus the face image is restrained from being an unnatural face image.

D. Fourth Embodiment

Figure 23:
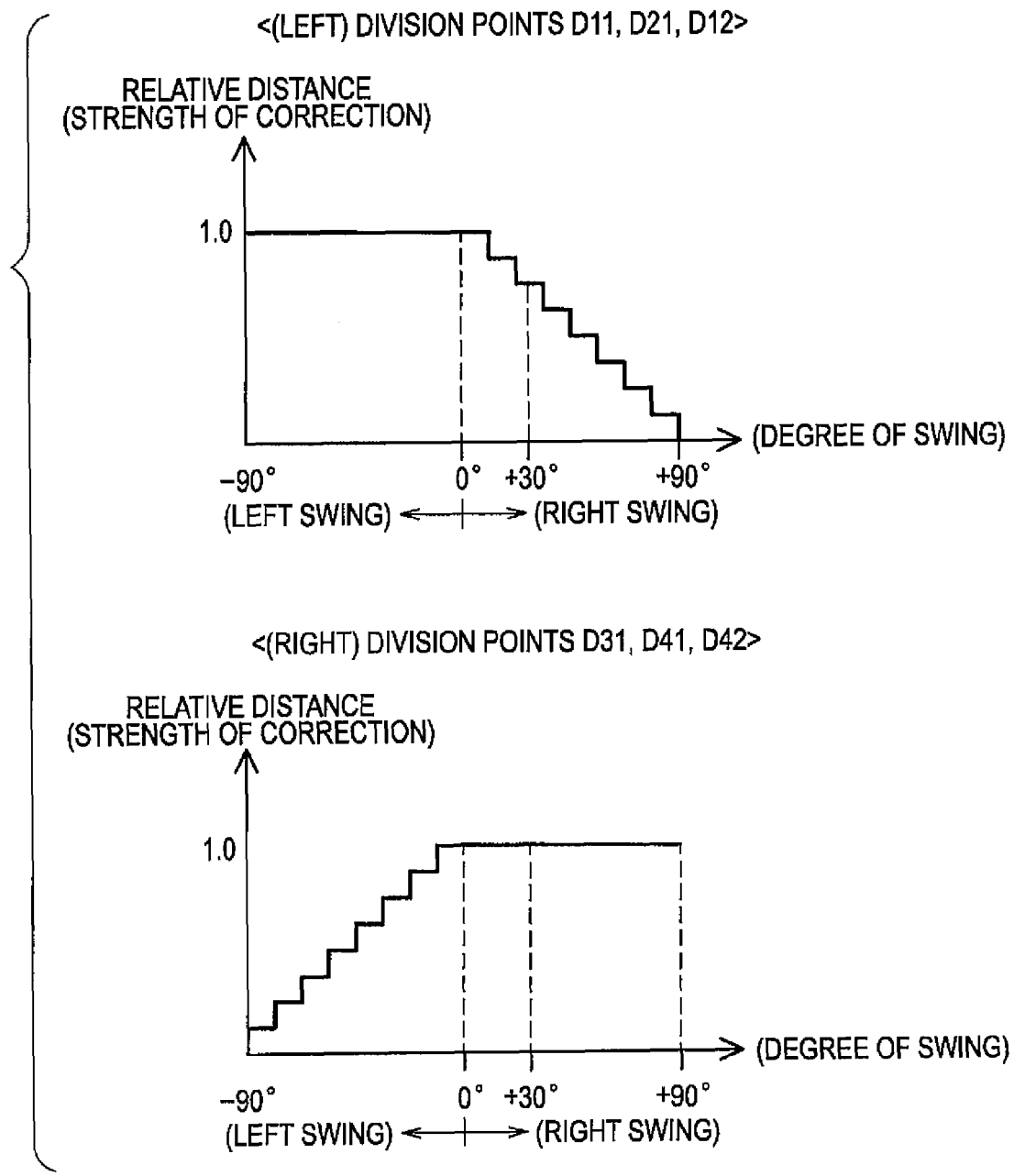
FIG. 23 is an explanatory diagram schematically showing movement distances of division points set in the division-point movement table of FIG. 14 according to a fourth embodiment.

FIG. 23 is an explanatory diagram schematically showing movement distances of the division points D set in each table constituting the division-point movement table 420 according to a fourth embodiment. The upper and lower graphs in FIG. 23 have the same horizontal and vertical axes and a meaning equal to those of FIG. 18.

The movement distances of the division points D set in each table for a printer in the fourth embodiment are different from those of printer 100 of the first embodiment. Specifically, in the printer 100 of the first embodiment, the movement distances of the division points D11, D21 and D12 located at the left side are set (see FIG. 18) to continuously decrease as a degree of swing increases (an angle for the swing increases in the plus side) when the face is swung in the right direction. On the other hand, in the printer of the fourth embodiment, the movement distances of these division points D11, D21, and D12 are set so as to decrease in a staircase pattern as the degree of swing increases when the face is swung in the right direction.

Similarly, the movement distances (relative movement distances) of the division points D31, D41 and D42 located at the right side are set to decrease in a staircase pattern as a degree of swing increases (an angle for the swing increases in the minus side) when the face is swung in the left direction. In addition, both the movement distances of the division points D11, D21 and D12 when the face is swung in the left direction and the movement distances of the division points D31, D41 and D42 when the face is swung in the right direction are constant similarl to the first embodiment.

In a large sense, in the printer of the fourth embodiment, the transformation degree of an area positioned in the opposite direction of the face direction in the transforming area is decreased as the degree of swing increases. For example, in case of the division points D11, D21 and D12 located at the left side, when movement distances at both an angle smaller than +30° (for example, 0°) and an angle larger than +30° (for example, +90°) are compared, the movement distance for 0° is "1.0" and the movement distance for +90° becomes zero. The printer of the fourth embodiment shows a similar effect to that of the printer 100 in the first embodiment. In addition, as also understood from the first to fourth embodiments, when the degree of swing is larger than a certain value (+30° in the above-described example), the image processing apparatus of the invention can adopt an arbitrary configuration in which the movement distance is set to be small and the transformation degree decreases compared to when the degree of swing is smaller than the certain value.

E. Fifth Embodiment

Figure 24:
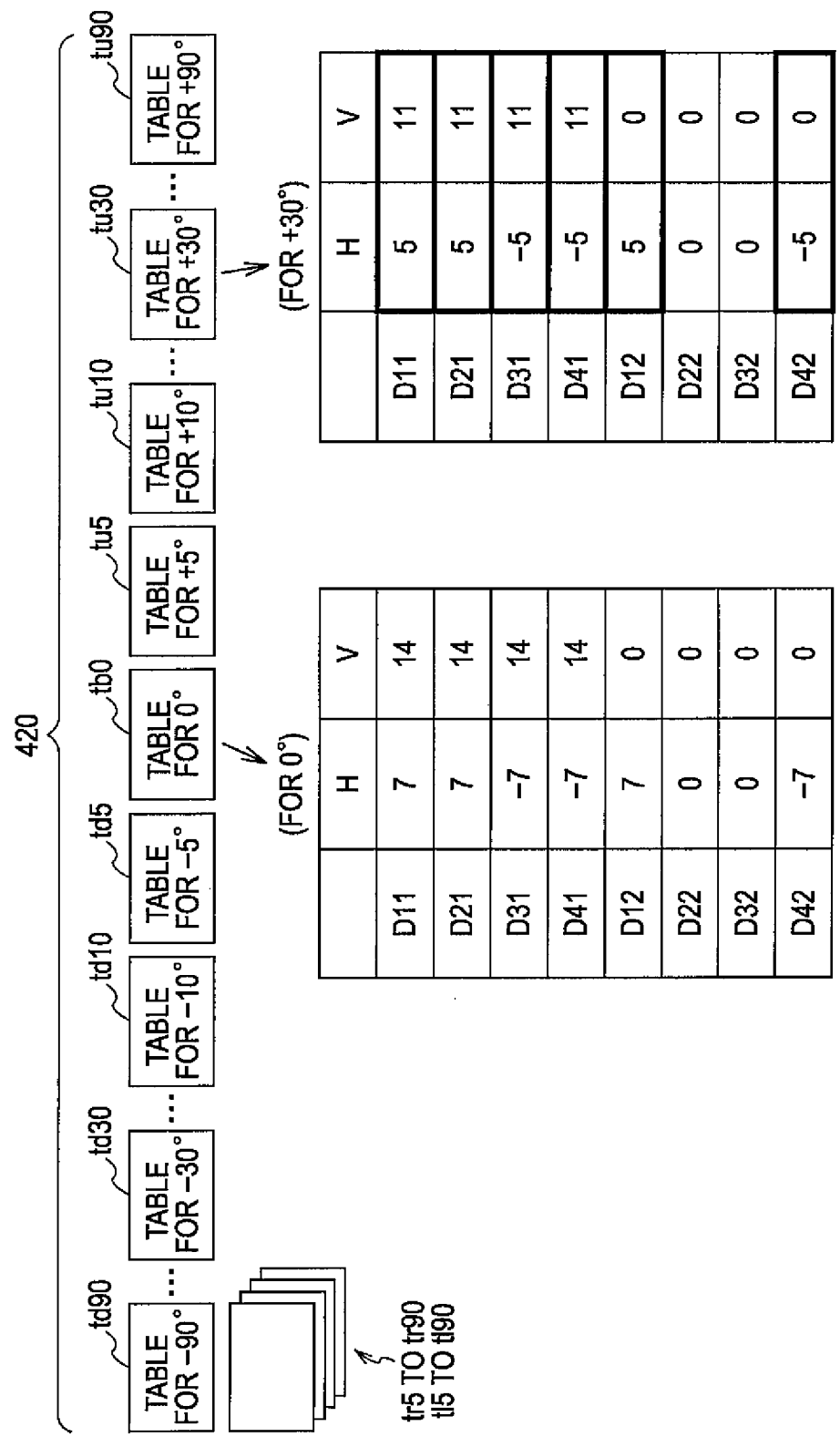
FIG. 24 illustrates a division-point movement table according to a fifth embodiment.

FIG. 24 is an explanatory diagram showing a detailed configuration of the division-point movement table 420 according to a fifth embodiment. The printer of the fifth embodiment is different from printer 100 of the first embodiment in that tables corresponding to swing in upper and lower directions are included as the division-point movement table 420 in addition to tables tr5-tr90 and tl5-tl90 (see FIG. 14) corresponding to the swing in the left and right directions.

Specifically, the division-point movement table 420 in the fifth embodiment includes tables used when the face is swung in an upper direction (a plus angle) and tables used when the face is swung in a lower direction (a minus angle) in addition to tables tr5-tr90 and tl5-tl90. In FIG. 24, a table tu5 for +5°, a table tu10 for +10°, a table tu30 for +30°, and a table tu90 for +90° are illustrated as the tables used when the face is swung in an upper direction, Moreover, a table td5 for −5°, a table td10 for −10°, a table td30 for −30°, and a table td90 for −90° are illustrated as the tables used when the face is swung in a lower direction.

In the fifth embodiment, similar to the first embodiment, a movement distance of each division point D is set to decrease as a degree of swing is large. However, according to the fifth embodiment, unlike the first embodiment, movement distances of combinations (D11 and D41, D21 and D31, and D12 and D42) of two division points D having a symmetric position relationship for the reference line RL regardless of the degrees of swing are set to be equal at the opposite side and the same side to and as the face direction. For example, in the table tu30 for +30°, the movement distance (5, 11) of the division point D11 and the movement distance (−5, 11) of the division point D41 symmetrically positioned with D11 for the reference line RL have a same movement distance (size of a vector).

Figure 25:
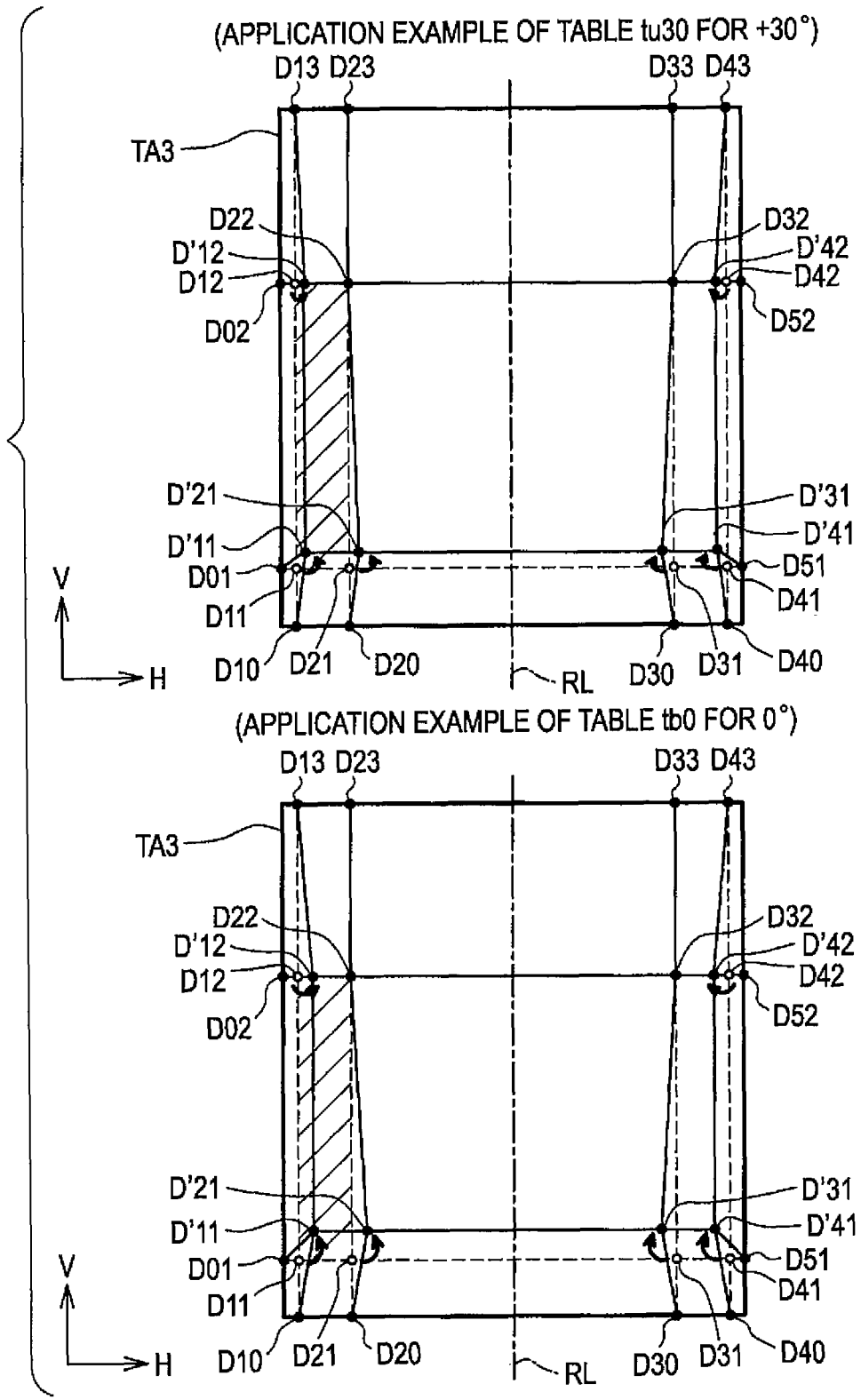
FIG. 25 is an explanatory diagram showing examples of movement of each division point when the tables for +30° and for 0° are respectively applied according to the fifth embodiment.

FIG. 25 is an explanatory diagram showing examples of movement of each division point D when the table tu30 for +30° and the table tb0 for 0° are respectively applied according to the fifth embodiment. In FIG. 25, the upper portion shows an application example of the table tu30 for +30°, and the lower-portion shows an application example of the table tb0 for 0°. In addition, the rectangular frames of thick solid lines in the upper and lower portions show a transforming area TA3 set on the basis of a face area (not illustrated) of a person facing upward only +30°.

As illustrated in FIG. 25, even when either the table tb0 or the table tu30 is applied, the face image is transformed into a bilaterally symmetric pattern. At this time, a movement distance of each division point when the table tu30 for +30° is applied (upper portion) is smaller compared to when the table tb0 for 0° is applied (lower portion). Therefore, the transformation degree when the table tu30 for +30° is applied becomes smaller than that when the table tb0 for 0° is applied.

FIG. 26 is an explanatory diagram showing a concrete transformation aspect for a transforming area TA3 when the table tu30 for +30° is used and when the table tb0 for 0° is used. In FIG. 26, similar to FIG. 16, the outline of the person before the transformation is shown in a dashed line for convenient comparison. When the table tu30 for +30° is applied (upper portion) in the case that the face is swung in the upper direction and the degree of swing is +30°, the portions of cheeks and jaw are slimmed and the face image becomes a naturally good-looking image.

On the other hand, when only the table tb0 for 0° is prepared as the division-point movement table 420 and is applied when the face is swung in an upper direction and the degree of swing is +30° (the lower portion), the face image after the transformation becomes unnatural. Specifically, a part on the outline PA3 at the right side and a part on the outline PA4 at the left side seems to be unnaturally dented. The reason is that an outline PA32 included in the transforming area TA3 is transformed comparatively largely but an outline PA31 not included in the transforming area TA3 is not transformed in the outline PA3. Similarly, that is because an outline PA42 included in the transforming area TA3 is transformed comparatively largely but an outline PA41 not included in the transforming area TA3 is not transformed in the outline PA4 at the left side.

In addition, even when the transforming area TA3 is set to include all the outlines PA3 and PA4, the face image after the transformation becomes unnatural. An expected good face image cannot be obtained because the face is swung in an upper direction and thus a part (for example, a neck) different from a part of the outline of the face expected for the transformation process (step S800) becomes a transformation target.

Figure 27:
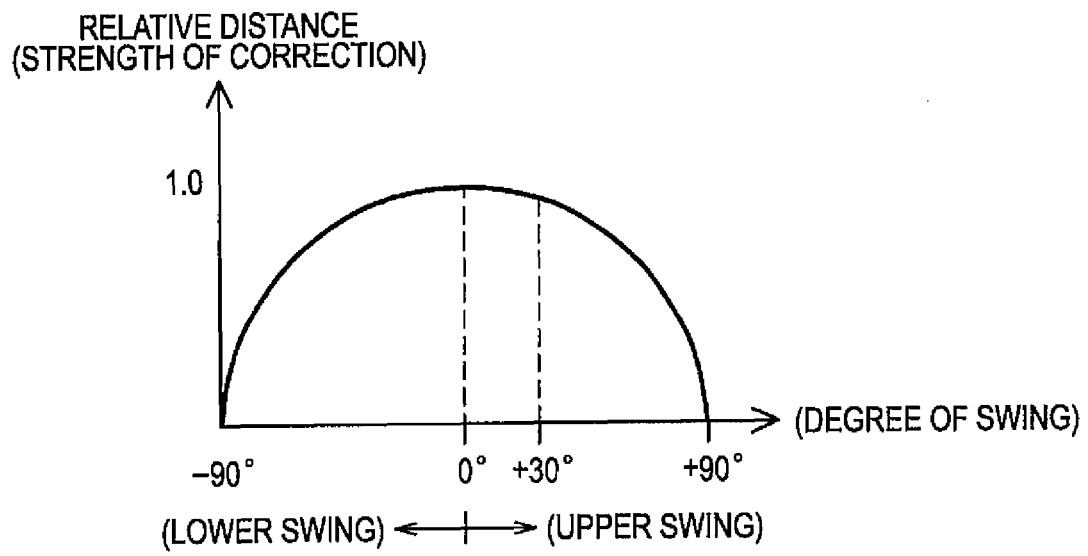
FIG. 27 is an explanatory diagram schematically showing movement distances of division points set in the division-point movement table according to the fifth embodiment.

FIG. 27 is an explanatory diagram schematically showing movement distances of the division points D set in each table constituting the division points D at the left side 420 according to the fifth embodiment. The horizontal and vertical axes of FIG. 27 are the same as those of FIG. 18.

In the above-described embodiments, the movement distances of a division point D at the left side and a division point D at the right side are different from each other among the movement distances set in each division-point movement table (see FIG. 18), but the movement distances of any division point D according to the fifth embodiment are shown as a graph illustrated in FIG. 23. Moreover, in the above-described embodiments, the movement distance of a division point D located in the same direction as the face direction is large compared to the movement distance of a division point D located in the opposite direction of the face direction. However, in the fourth embodiment, the same movement distances of the division points D are set in the same direction and the opposite direction as and to the face direction. Therefore, for example, the movement distances set for each division point D are the same when the face is swung in an upper direction and the degree of swing is +30° and when the face is swung in a lower direction and the degree of swing is −30°.

The printer of the fifth embodiment can also reduce a transformation degree as the degree of swing increases in the upper or lower direction. As the degree of swing increases in the upper or lower direction, an outline portion expected not to be transformed is transformed with high possibility. Therefore, by this configuration, even when the face is swung in an upper or lower direction, the face image after the transformation is restrained from being unnatural regardless of a large or small degree of swing.

F. Modified Examples

Additional components other than those components claimed and described may be omitted as appropriate from this description. The invention is not limited to the examples and embodiment described herein, and can be executed in various kinds of aspects within a range not departing from the scope of the invention. The following modification, for example, is also possible.

F1. Modified Example 1

In step S600 of the first to fourth embodiments, it is estimated whether the face is swung to the left or right direction. Alternatively, it can be estimated only whether the face is swung to the left or right direction and not estimated whether the face is swung to the left or right direction. In this case, unlike the first embodiment, a table according to only a degree of swing is prepared as each division-point movement table. For example, the table in the fifth embodiment can be used (see FIG. 27). In this way, similar to the fifth embodiment, the face image after the transformation is restrained from being unnatural regardless of a large or small degree of swing.

F2. Modified Example 2

The method (step S600 in FIGS. 2 and 21) for estimating a face direction in the above-described embodiments is used as an example, and the face direction can be estimated by other methods. For example, a width Wer of a right eye area Er and a width Wel of a left eye area El may be simply compared and it is possible to estimate that the face is swung in the right direction when the width Wer of the right eye area Er is large and not less than a predetermined ratio, the face is swung in the left direction when the width Wel of the left eye area El is large and not less than the predetermined ratio, and the face direction is the front direction in the other cases. In addition, the degree of swing can be estimated by the ratio between the width Wer and the width Wel.

Alternatively, a width Wm of a mouth area Ma and the width Wer (or Wel) of the eye area Er (or El) may be simply compared and it is possible to estimate that the face is swung in the upper direction when the width Wm of the mouth area Ma is large and not less than a predetermined ratio, the face is swung in the lower direction when the width Wer (or Wel) of the eye area Er (or El) is large and not less than the predetermined ratio, and the face direction is the front direction in the other cases. In addition, the degree of swing can be estimated by the ratio between the width Wm and the width Wer (or Wel).

Moreover, the face direction can also be estimated on the basis of a relation between a face area and an organ area. For example, on the basis of positions of the eye areas Er and El in the face area, it can be estimated that the face is swung in the right or left direction. Moreover, on the basis of a position of the mouth area Ma in the face area, it can be estimated that the face is swung in the upper or lower direction.

Moreover, in place of the method for estimating a direction and degree of swing of the face on the basis of the face and organ areas described above, the direction and degree of swing of the face can be estimated by other methods. For example, when data showing a direction and degree of swing of the face are recorded on the memory card MC separately from image data, the direction and degree of swing of the face can be estimated on the basis of that data.

F3. Modified Example 3

In the estimation of a face direction according to the above-described embodiments and modified examples, an estimated face direction adopts three kinds of direction: a front direction, a swing direction to the left or right side, and a swing direction to the upper or lower side; or five kinds of the direction: a front direction, a swing direction to the right side, a swing direction to the left side, a swing direction to the upper side, and a swing direction to the lower side. However, two kinds of direction may be adopted: a front direction and a direction other than the front direction. Moreover, other directions such as a swung direction to the right and upper side, a swung direction to the right and lower side, a swung direction to the left and upper side, or a swung direction to the left and lower side may be adopted.

F4. Modified Example 4

While a size of a transforming area on the face is reduced (slimmed) by the face shape correction process in the above-described embodiments, other transformations may be performed in place of reduction of the face size. For example, the face size can be increased to an ample face size after the transformation that is natural and looks good. Moreover, when the degree of swing is larger than a certain value in the above-described embodiments, the transformation degree is decreased compared to when the degree of swing is smaller than this certain value. However, the invention can also have a configuration opposite to this. For example, when an image is processed for the purpose of deformation (unnatural transformation) of the face, the transformation degree can be increased and the face image can be also unnaturally transformed intentionally when the degree of swing is larger than a certain value, compared to when the degree of swing is smaller than this certain value.

F5. Modified Example 5

The detection of an organ in a face area is performed in the above-described embodiments, but it is not necessary to limit a range where an organ is detected to the face area. For example, an organ can be also detected in an entire target image. However, when detecting an organ in the face area is performed, speeding up of the process can be planned. Moreover, while the face area is detected in the above-described embodiments, it is not necessary to detect the face area. Even when the face area is not detected, an organ area for a predetermined range (for example, the entire range) of the target image is detected, and the face direction can be estimated on the basis of the detected organ area.

F6. Modified Example 6

The transforming area is larger than the face area in the above-described embodiments, but it can also have a size equal to or smaller than that of the face area. When the transforming area is the same as the face area, step S810 (FIG. 9) can be omitted. Moreover, while both the face and transforming areas are rectangular in the above-described embodiments, they can instead be set to have an arbitrary shape such as a circle or a triangle.

F7. Modified Example 7

The entire face area detected in step S200 of the face shape correction process is transformed (reduced in face size) by performing steps S300-S800 in the above-described embodiments. Alternatively, only a face area specified by a user can be transformed. In this case, after the face area is detected (Yes in step S300), an image (for example, the image TI in FIG. 4) clarifying the face area and a user interface including a button for selecting and determining the face area to be transformed by the user can be displayed on the display section 150.

F8. Modified Example 8

The above-described embodiments perform the processes until the face shape correction process is executed on the target image. In addition, the image obtained as the result of the face shape correction process can be printed by means of the printer engine 160 or stored in the memory 120.

F9. Modified Example 9

The face shape correction process by the printer 100 as an image processing apparatus is described in the above-described embodiments, but a part of or all the face shape correction process may be executed in a personal computer, a digital camera, or the like. Moreover, the printer 100 is not limited to an ink-jet printer, and may be another type of printer, for example, a laser printer or a dye sublimation printer.

F10. Modified Example 10

In the above-described embodiments, a part of the configuration realized by hardware may be replaced by software, and a part of the configuration realized by software may be reversely replaced by hardware.

What is claimed is:

1. An image processing apparatus comprising:
a face direction estimating section that estimates a direction of a face and a degree of swing of the face in a target image including a face image when a front direction of the face is used as a reference; and
an image correcting section that transforms a correction target area to be corrected, which includes at least a part of the face image, in accordance with the degree of swing,
wherein the image correcting section reduces a degree of transformation for the correction target area when the degree of swing is larger than a certain value compared to when the degree of swing is smaller than the certain value.

2. An image processing apparatus comprising:
a face direction estimating section that estimates a direction of a face and a degree of swing of the face in a target image including a face image when a front direction of the face is used as a reference; and
an image correcting section that transforms a correction target area to be corrected, which includes at least a part of the face image, in accordance with the degree of swing,
wherein the image correcting section reduces a degree of transformation for an area on the opposite side of the face direction in the correction target area compared to a degree of transformation for an area on the same side as the face direction.

3. An image processing apparatus comprising:
a face direction estimating section that estimates a direction of a face and a degree of swing of the face in a target image including a face image when a front direction of the face is used as a reference; and
an image correcting section that transforms a correction target area to be corrected, which includes at least a part of the face image, in accordance with the degree of swing,
wherein the image correcting section does not transform at least an area on the opposite side of the face direction in the correction target area when the degree of swing is larger than a predetermined threshold value.

4. The image processing apparatus according to claim 1, wherein when estimating the direction of the face and the degree of swing of the face, the face direction estimating section:
(i) detects an area including an organ image of the face in the target image as an organ area;
(ii) computes a reference width as an index correlated with a width of the face and a reference height as an index correlated with a height of the face on the basis of the organ area; and
(iii) estimates the direction of the face and the degree of swing of the face on the basis of a ratio between the reference width and the reference height.

5. The image processing apparatus according to claim 2, wherein when estimating the direction of the face and the degree of swing of the face, the face direction estimating section:
(i) detects an area including an organ image of the face in the target image as an organ area;
(ii) computes a reference width as an index correlated with a width of the face and a reference height as an index correlated with a height of the face on the basis of the organ area; and
(iii) estimates the direction of the face and the degree of swing of the face on the basis of a ratio between the reference width and the reference height.

6. The image processing apparatus according to claim 3, wherein when estimating the direction of the face and the degree of swing of the face, the face direction estimating section:
(i) detects an area including an organ image of the face in the target image as an organ area;
(ii) computes a reference width as an index correlated with a width of the face and a reference height as an index correlated with a height of the face on the basis of the organ area; and
(iii) estimates the direction of the face and the degree of swing of the face on the basis of a ratio between the reference width and the reference height.

* * * * *